United States Patent
Zhang et al.

(10) Patent No.: US 11,356,989 B2
(45) Date of Patent: Jun. 7, 2022

(54) REPORTING APERIODIC CSI VIA PUCCH

(71) Applicant: QUALCOMM Incorporated, San Diego, CA (US)

(72) Inventors: Yu Zhang, Beijing (CN); Chao Wei, Beijing (CN); Liangming Wu, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/615,534

(22) PCT Filed: Jun. 15, 2018

(86) PCT No.: PCT/CN2018/091449
§ 371 (c)(1),
(2) Date: Nov. 21, 2019

(87) PCT Pub. No.: WO2018/228523
PCT Pub. Date: Dec. 20, 2018

(65) Prior Publication Data
US 2020/0178240 A1    Jun. 4, 2020

(30) Foreign Application Priority Data
Jun. 16, 2017  (WO) ................. PCT/CN2017/088598

(51) Int. Cl.
*H04W 72/04* (2009.01)
*H04L 5/00* (2006.01)

(52) U.S. Cl.
CPC ....... *H04W 72/0413* (2013.01); *H04L 5/0055* (2013.01); *H04W 72/042* (2013.01)

(58) Field of Classification Search
CPC ............ H04W 72/0413; H04W 72/042; H04L 5/0055
See application file for complete search history.

(56) References Cited

U.S. PATENT DOCUMENTS 10,863,494 B2 *  12/2020  Zhang ................... H04L 5/0048
11,139,877 B2 *  10/2021  Lee ........................ H04B 7/063
(Continued)

FOREIGN PATENT DOCUMENTS

CN          104038312 A        9/2014
CN          102006624 B        8/2015
(Continued)

OTHER PUBLICATIONS

International Search Report and Written Opinion—PCT/CN2017/088598—ISA/EPO—dated Mar. 6, 2018.
International Search Report and Written Opinion—PCT/CN2018/091449—ISA/EPO—dated Aug. 29, 2018.
Qualcomm Incorporated: "Remaining Aspects of PUCCH on SCell", 3GPP Draft; R1-152772, 3GPP TSG RAN WG1 #81, 3rd Generation Partnership Project (3GPP), Mobile Competence Centre; 650, Route Des Lucioles; F-06921 Sophia-Antipolis Cedex; France, vol. RAN WG1. No. Fukuoka. Japan, May 25, 2015-May 29, 2015, May 24, 2015 (May 24, 2015), XP050969368, pp. 1-2, Retrieved from the Internet: URL: http://www.3gpp.org/ftp/Meetings_3GPP_SYNC/RAN1/Docs/ [retrieved on May 24, 2015], Section 2.
(Continued)

*Primary Examiner* — Michael J Moore, Jr.
(74) *Attorney, Agent, or Firm* — QUALCOMM Incorporated

(57) ABSTRACT

Reporting aperiodic channel state information (A-CSI) via a physical uplink control channel (PUCCH) is disclosed. A UE receives a configuration to report aperiodic channel state information (A-CSI) using physical uplink control channel (PUCCH). The UE can report lightweight A-CSI via short/long PUCCH or may report heavy A-CSI via short/long PUCCH. The UE receives a trigger signal for PUCCH-based A-CSI reporting either by a dedicated downlink grant or by a group common DCI. When triggered via a DCI-based trigger, the PUCCH resource can be either a resource used for HARQ-ACK feedback, e.g., short PUCCH; or a semi-static configured PUCCH resource, e.g., either short PUCCH or long PUCCH. When triggered via a group common DCI-based trigger, the PUCCH resource can be either semi-statically configured, or dynamically indicated.

29 Claims, 14 Drawing Sheets

(56) References Cited

U.S. PATENT DOCUMENTS

| | | | |
|---|---|---|---|
| 2013/0028182 A1 | 1/2013 | Geirhofer et al. | |
| 2014/0086155 A1* | 3/2014 | Chen | H04L 5/0064 |
| | | | 370/329 |
| 2015/0103774 A1 | 4/2015 | Nagata et al. | |
| 2016/0029238 A1 | 1/2016 | Chen et al. | |
| 2016/0219618 A1 | 7/2016 | Rico Alvarino et al. | |
| 2017/0195031 A1* | 7/2017 | Onggosanusi | H04B 7/0626 |
| 2018/0063736 A1* | 3/2018 | Sadeghi | H04W 24/10 |
| 2018/0092149 A1* | 3/2018 | Davydov | H04L 1/0029 |
| 2018/0097603 A1 | 4/2018 | Lee et al. | |
| 2018/0310193 A1* | 10/2018 | Bhorkar | H04B 7/0626 |
| 2019/0123801 A1* | 4/2019 | Yum | H04L 5/0023 |
| 2020/0077416 A1* | 3/2020 | Yang | H04L 5/0091 |
| 2020/0177254 A1* | 6/2020 | Lee | H04L 5/0051 |
| 2020/0295903 A1* | 9/2020 | Faxer | H04L 5/0057 |
| 2020/0295905 A1* | 9/2020 | Takeda | H04W 72/04 |
| 2020/0367244 A1* | 11/2020 | Yang | H04W 72/02 |
| 2020/0382256 A1* | 12/2020 | Faxer | H04W 72/042 |

FOREIGN PATENT DOCUMENTS

| | | |
|---|---|---|
| CN | 106301720 A | 1/2017 |
| CN | 106487484 A | 3/2017 |
| CN | 106656280 A | 5/2017 |
| EP | 3282629 A1 | 2/2018 |
| WO | WO-2016089106 A1 | 6/2016 |
| WO | 2016121428 A1 | 8/2016 |
| WO | WO-2016163819 A1 | 10/2016 |
| WO | WO-2016182363 A1 | 11/2016 |

OTHER PUBLICATIONS

Qualcomm Incorporated: "CSI Multiplexing with HARQ-ACK", 3GPP Draft; 3GPP TSG RAN WG1 #70bis, R1-124436 CSI Multiplexing with ACK, 3rd Generation Partnership Project (3GPP), Mobile Competence Centre, 650, Route Des Lucioles; F-06921 Sophia-Antipolis Cedex; France, vol. RAN WG1, No. San Diego, USA; Oct. 8, 2012-Oct. 12, 2012, Sep. 29, 2012 (Sep. 29, 2012), XP050662328, pp. 1-3, Retrieved from the Internet: URL: http://www.3gpp.org/ftp/tsg_ran/WG1_RL1/TSGR1_70b/Docs/, [retrieved on Sep. 29, 2012], Sections 1. 2.

Qualcomm Incorporated: "Remaining Aspects of PUCCH on SCell", 3GPP Draft; RI-152772, 3GPP TSG RAN WG1 #81,3rd Generation Partnership Project (3GPP), Mobile Competence Centre; 650, Route Des Lucioles; F-06921 Sophia-Antipolis Cedex; France, vol. RAN WG1. No. Fukuoka. Japan, May 25, 2015-May 29, 2015, May 24, 2015 (May 24, 2015), XP050969368, pp. 1-2, Retrieved from the Internet: URL: http://www.3gpp.org/ftp/Meetings 3GPP_SYNC/RAN1/Docs/[retrieved on May 24, 2015], Section 2.

Supplementary European Search Report—18817258.9—Search Authority—Munich—dated Feb. 9, 2021.

Samsung: "Discussions on CSI Measurements and Reporting for NR", 3GPP TSG RAN WG1 Meeting #89, R1-1707959, Hangzhou, P.R. China May 15-19, 2017, 7 Pages.

\* cited by examiner

REPORTING APERIODIC CSI VIA PUCCH

CROSS-REFERENCE TO RELATED APPLICATIONS

This application claims the benefit of CN App. No.: PCT/CN2018/091449, entitled, "REPORTING APERIODIC CSI VIA PUCCH", filed Jun. 15, 2018 and claims the benefit of CN App. No.: PCT/CN2017/088598, entitled, "Reporting Aperiodic CSI via pucch," filed on Jun. 16, 2017, which is expressly incorporated by reference herein in its entirety.

BACKGROUND

Field

Aspects of the present disclosure relate generally to wireless communication systems, and more particularly, to reporting aperiodic channel state information (CSI) via a physical uplink control channel (PUCCH).

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes receiving, by a UE, a feedback configuration to report aperiodic channel state information (A-CSI) feedback using a physical uplink control channel (PUCCH), receiving, by the UE, a CSI trigger to report A-CSI feedback, wherein the CSI trigger includes one of: a dedicated downlink control indicator (DCI) for the A-CSI feedback or a group common DCI, determining, by the UE, channel condition information associated with the A-CSI feedback in response to the CSI trigger, and reporting, by the UE to a base station, the A-CSI feedback using the PUCCH.

In an additional aspect of the disclosure, an apparatus configured for wireless communication includes means for receiving, by a UE, a feedback configuration to report A-CSI feedback using a PUCCH, means for receiving, by the UE, a CSI trigger to report A-CSI feedback, wherein the CSI trigger includes one of: a dedicated downlink control indicator (DCI) for the A-CSI feedback or a group common DCI, means for determining, by the UE, channel condition information associated with the A-CSI feedback in response to the CSI trigger, and means for reporting, by the UE to a base station, the A-CSI feedback using the PUCCH.

In an additional aspect of the disclosure, a non-transitory computer-readable medium having program code recorded thereon. The program code further includes code to receive, by a UE, a feedback configuration to report A-CSI feedback using a PUCCH, code to receive, by the UE, a CSI trigger to report A-CSI feedback, wherein the CSI trigger includes one of: a dedicated downlink control indicator (DCI) for the A-CSI feedback or a group common DCI, code to determine, by the UE, channel condition information associated with the A-CSI feedback in response to the CSI trigger, and code to report, by the UE to a base station, the A-CSI feedback using the PUCCH.

In an additional aspect of the disclosure, an apparatus configured for wireless communication is disclosed. The apparatus includes at least one processor, and a memory coupled to the processor. The processor is configured to receive, by a UE, a feedback configuration to report A-CSI feedback using a PUCCH, code to receive, by the UE, a CSI trigger to report A-CSI feedback, wherein the CSI trigger includes one of: a dedicated downlink control indicator (DCI) for the A-CSI feedback or a group common DCI, code to determine, by the UE, channel condition information associated with the A-CSI feedback in response to the CSI trigger, and code to report, by the UE to a base station, the A-CSI feedback using the PUCCH.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Figure 1:
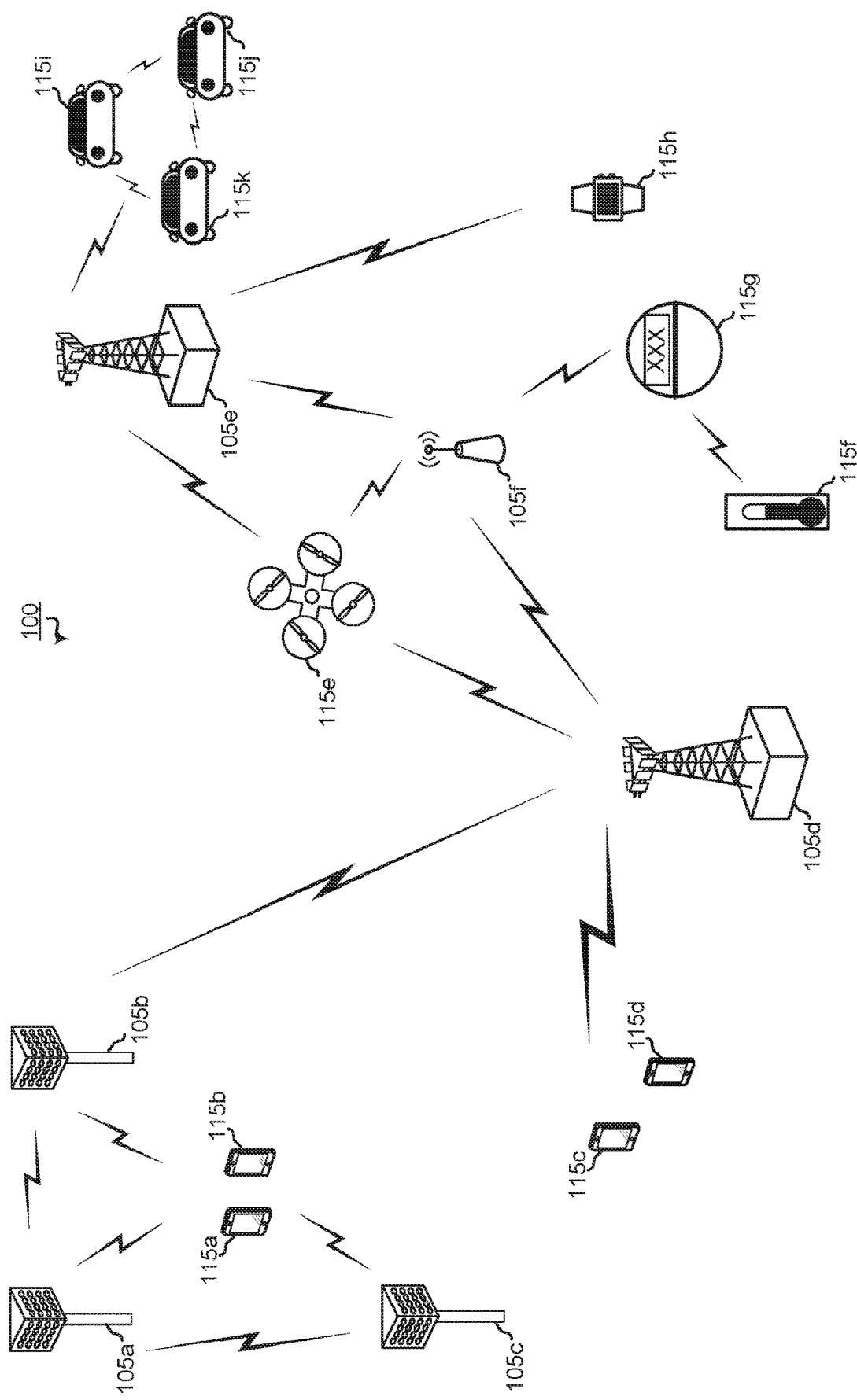
FIG. 1 is a block diagram illustrating details of a wireless communication system.

The Appendix provides further details regarding various embodiments of this disclosure and the subject matter therein forms a part of the specification of this application.

DETAILED DESCRIPTION

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through 5G network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. 5G network 100 may also provide additional network efficiency through dynamic, low-latency TDD/FDD communications, such as in a vehicle-to-vehicle (V2V) mesh network between UEs 115*i*-115*k* communicating with macro base station 105*e*.

Figure 2:
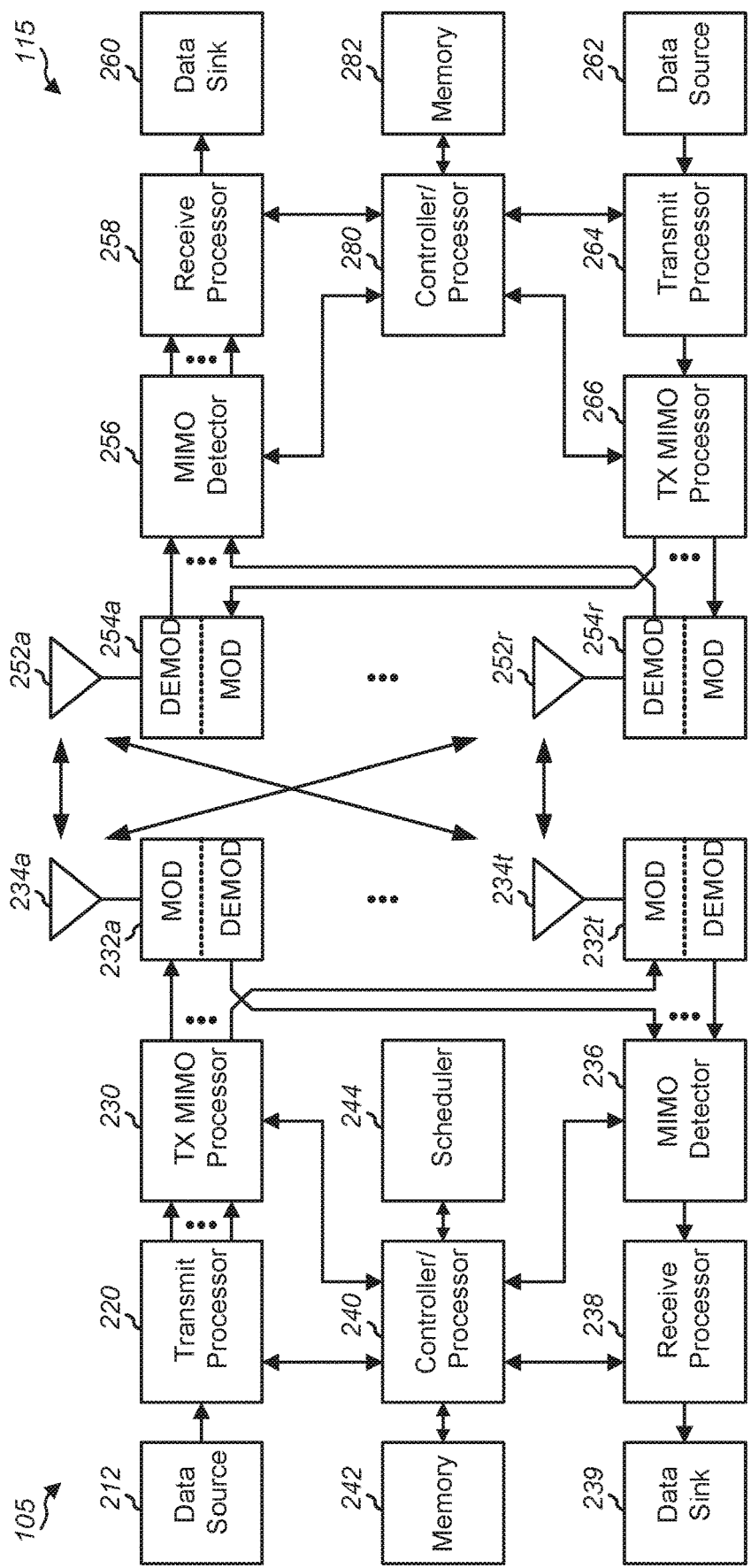
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232*a* through 232*t* may be transmitted via the antennas 234*a* through 234*t*, respectively.

At the UE 115, the antennas 252*a* through 252*r* may receive the downlink signals from the base station 105 and may provide received signals to the demodulators (DE-MODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254*a* through 254*r*, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254*a* through 254*r* (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIG. 5, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
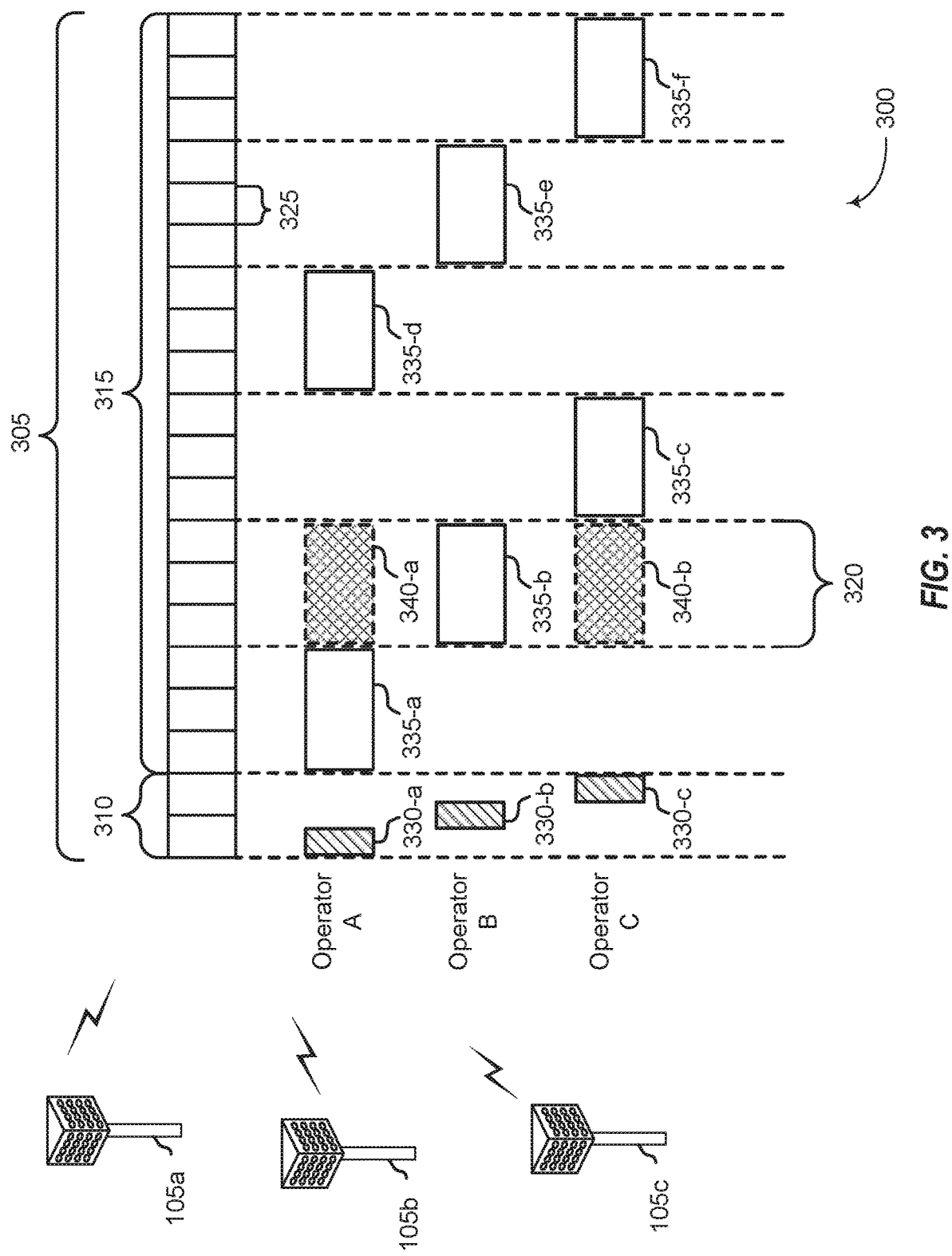
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-*a* may be reserved for exclusive communications by Operator A, such as through base station 105*a*, resources 330-*b* may be reserved for exclusive communications by Operator B, such as through base station 105*b*, and resources 330-*c* may be reserved for exclusive communications by Operator C, such as through base station 105*c*. Since the resources 330-*a* are reserved for exclusive communications by Operator A, neither Operator B nor Operator C can communicate during resources 330-*a*, even if Operator A chooses not to communicate during those resources. That is, access to exclusive resources is limited to the designated network operator. Similar restrictions apply to resources 330-*b* for Operator B and resources 330-*c* for Operator C. The wireless nodes of Operator A (e.g., UEs 115 or base stations 105) may communicate any information desired during their exclusive resources 330-*a*, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-*a* may be prioritized for use by Operator A and may therefore be referred to as a G-INT for Operator A (e.g., G-INT-OpA). Similarly, resources 335-*b* may be prioritized for Operator B, resources 335-*c* may be prioritized for Operator C, resources 335-*d* may be prioritized for Operator A, resources 335-*e* may be prioritized for Operator B, and resources 335-*f* may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-*a* and resources 335-*b*), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-ρs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-ρs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

The channel-state information (CSI) reporting from the UE to the network provides the network with information about the downlink channel conditions. Downlink channel-dependent scheduling depends on the downlink channel conditions. Such downlink channel-dependent scheduling is a pertinent feature for LTE and NR network operations. CSI may consist of one or several pieces of information, such as rank indicator (RI), precoding matrix indicator (PMI), channel quality information (CQI), CSI reference signal resource indicator (CRI), etc. In LTE, there are generally two types of CSI reports: periodic CSI (P-CSI) and aperiodic CSI (A-CSI). P-CSI reports are generally delivered with a certain periodicity configured by the network. A-CSI reports are generally delivered when explicitly requested by the network through some form of signaling, such as a flag in an uplink scheduling grant. Uplink resources for CSI reporting in LTE include both PUCCH and PUSCH resources. P-CSI is generally delivered using a semi-statically configured PUCCH resource. If the UE has a valid uplink grant, P-CSI may be delivered on PUSCH as well. A-CSI is generally delivered via PUSCH, on a dynamically assigned resource. Examples of CSI components include RI, providing a recommendation on the transmission rank; PMI, indicating a preferred precoder conditioned on the number of layers indicated by the RI; CQI, suggesting the modulation-and-coding scheme (MCS) to achieve certain block error rates (BLER) with the recommended PMI/RI; and CRI, representing the selected one out of multiple pre-configured CSI-RS resources.

Figure 4:
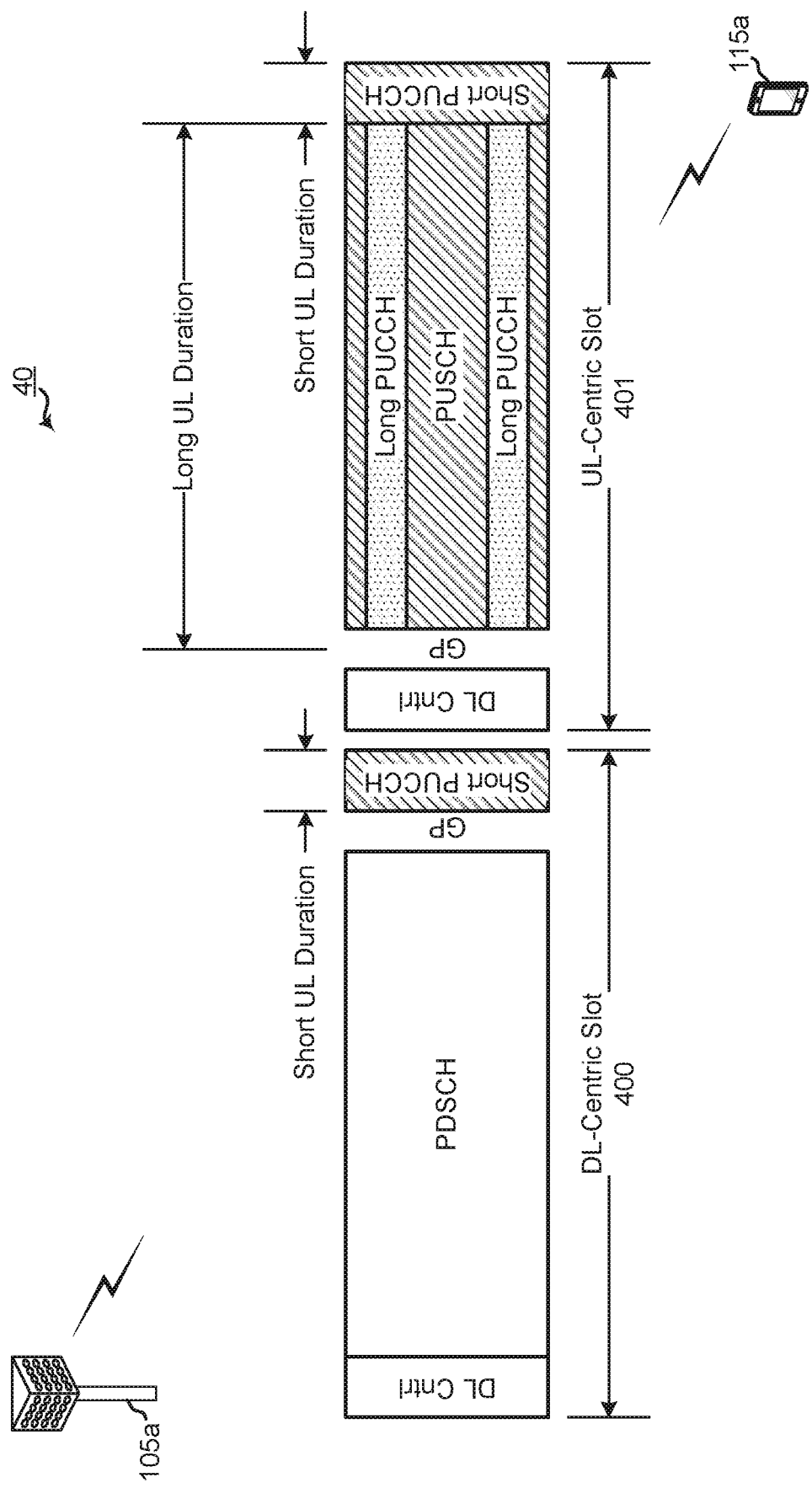
FIG. 4 is a block diagram illustrating transmission slots in an NR network.

FIG. 4 is a block diagram illustrating transmission slots 40 in an NR network. In communications between gNB 105a and UE 115a, the transmission slots 40 are generally divided into downlink-centric slots 400 and uplink-centric slots 401. Within downlink-centric slot 400, downlink control signaling initiates the transmission, followed by the data in the PDSCH, a short uplink duration of a short PUCCH then follows a guard period at the end of downlink-centric slot 400. Uplink-centric slot 401 begins with a short downlink control signaling followed by a long uplink duration uplink data transmissions in PUSCH after a guard period. The uplink-centric slot 401 will end with an uplink common burst which contains a short PUCCH without guard period.

In NR, A-CSI reporting may be used for on-demand CSI acquisition. A-CSI reporting may be used to report the link quality for a small number of antenna ports (e.g., multi-beam approach). The A-CSI report may be a lightweight CSI report (e.g., wideband, CQI/RI only). The A-CSI report may further deliver full CSI for a large number of antenna ports (e.g., single-beam approach). An uplink control information (UCI) can be up to hundreds of bits (e.g., subband Type II CSI for 32 ports). Moreover, under current configurations, PUSCH based A-CSI reporting can be inefficient.

Moreover, it may be the case that A-CSI reporting is requested when there are no uplink data available for transmission. In a first option to address such a no-data scenario, a CSI-only uplink grant may be scheduled for a UE. Such a grant may be limited by the downlink control channel capacity, such that these grants may carry uplink grants for UEs with uplink data and for UEs with CSI reports. In a second option to address such no-data scenarios, triggering of the A-CSI reporting may be held until uplink data is available. However, in such an option, the network cannot get CSI timely and the downlink channel-dependent scheduling may suffer accordingly. PUSCH may only be available in slots with a long uplink duration (e.g., no PUSCH in downlink-centric slot). Self-contained A-CSI reporting cannot be supported if it is triggered in a downlink-centric slot. Thus, there is a need to establish an efficient solution to deliver A-CSI reports. Various aspects of the present disclosure provide for triggering of A-CSI reporting using either uplink or downlink grants or by a group common DCI.

Figure 5:
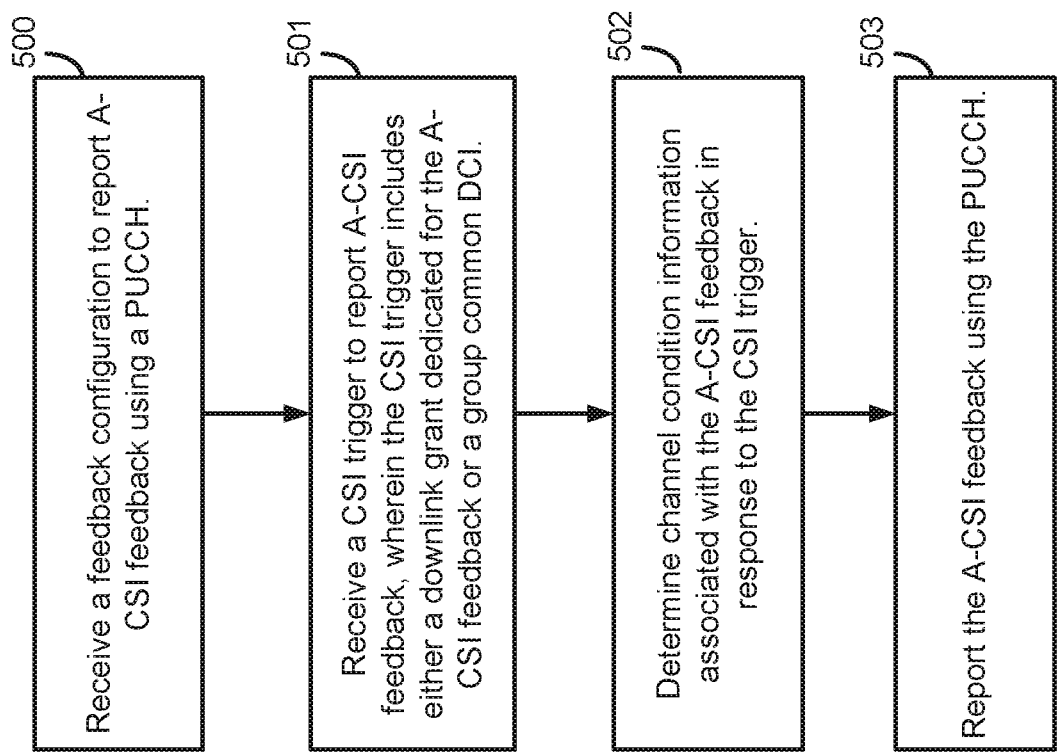
FIG. 5 is a block diagram illustrating example blocks executed to implement one aspect of the present disclosure.
Figure 15:
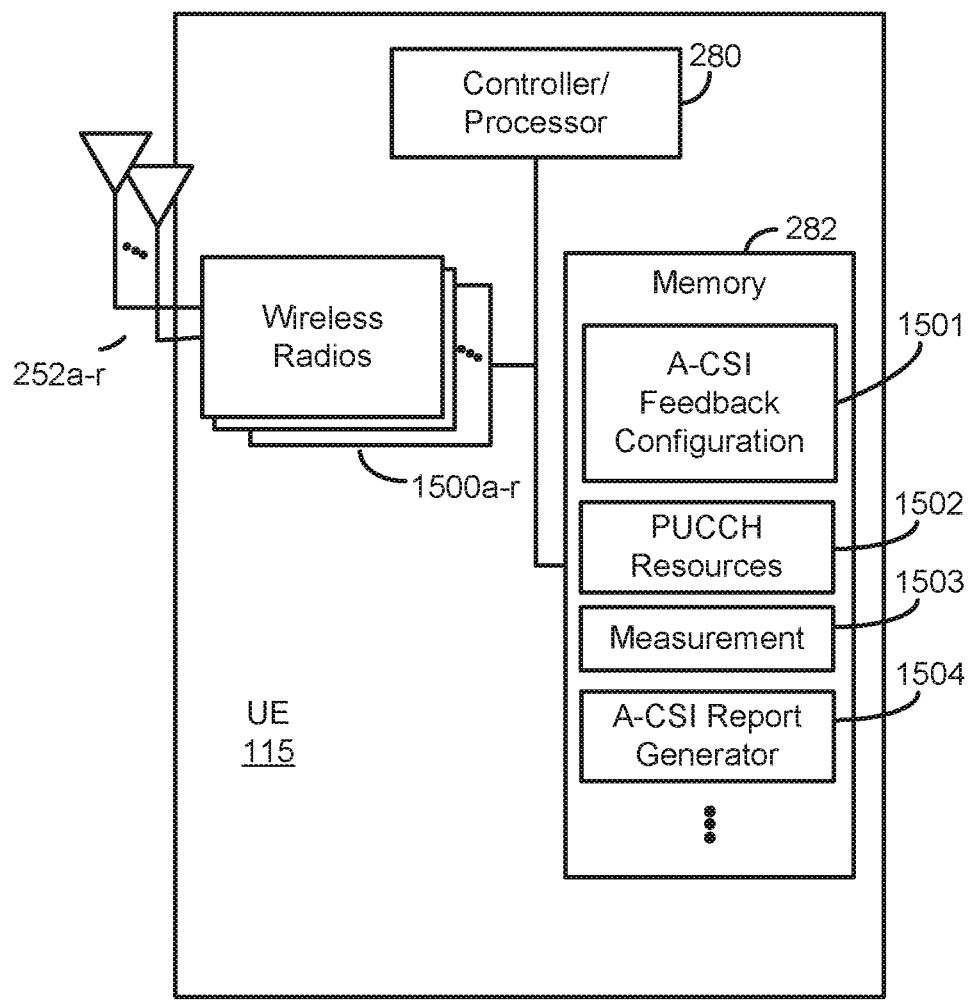
FIG. 15 is a block diagram illustrating a UE configured according to one aspect of the present disclosure.

FIG. 5 is a block diagram illustrating example blocks executed to implement one aspect of the present disclosure. The example blocks will also be described with respect to UE 115 as illustrated in FIG. 15. FIG. 15 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1500a-r and antennas 252a-r. Wireless radios 1500a-r includes various components and hardware, as illustrated in FIG. 2 for eNB 105, including modulator/demodulators 254a-r, MIMO detector 256, receive processor 258, transmit processor 264, and TX MIMO processor 266.

At block 500, a UE receives a feedback configuration to report A-CSI feedback using a PUCCH. For example, UE 115 receives a CSI report configuration identifier (ID), such as A-CSI feedback configuration 1501, from a serving base station via antennas 252a-r and wireless radios 1500a-r. UE 115 can report lightweight A-CSI via short/long PUCCH or may report heavy A-CSI via short/long PUCCH. UE 115 will store A-CSI feedback configuration 1501 in memory 282.

At block 501, the UE receives a CSI trigger to report A-CSI feedback, wherein the CSI trigger includes either a dedicated DCI for the A-CSI feedback or a group common DCI. As recognized by one of skill in the art, different DCI formats provide either uplink or downlink grant for uplink or downlink communications. Accordingly, the dedicated DCI may be either dedicated for downlink transmission or uplink transmission. For example, UE 115 receives the CSI trigger from the base station via antennas 252a-r and wireless radios 1500a-r. The CSI trigger allows for UE 115 to identify PUCCH resources 1502 and store in memory 282. UE 115 would then use PUCCH resources 1502 for transmitting the A-CSI feedback.

At block 502, the UE determines channel condition information associated with the A-CSI feedback in response to the CSI trigger. In response to the CSI trigger, UE 115 executes measurement logic 1503 to measure and process each of the CSI processes triggered in by the CSI trigger. Once the CSI information has been determined, UE 115, under control of controller/processor 280, executes A-CSI report generator to generate the A-CSI report with the determined CSI information. When triggered via a DCI-based trigger, the PUCCH resources can be either a resource used for HARQ-ACK feedback, e.g., short PUCCH; or a semi-static configured PUCCH resource, e.g., either short PUCCH or long PUCCH. When triggered via a group common DCI-based trigger, the PUCCH resource can be either semi-statically configured, or dynamically indicated.

At block 503, the UE reports the A-CSI feedback using the PUCCH. For example, UE 115 will transmit the generated A-CSI feedback report and transmit to the base station via wireless radios 1500a-r and antennas 252a-r.

Figure 6:
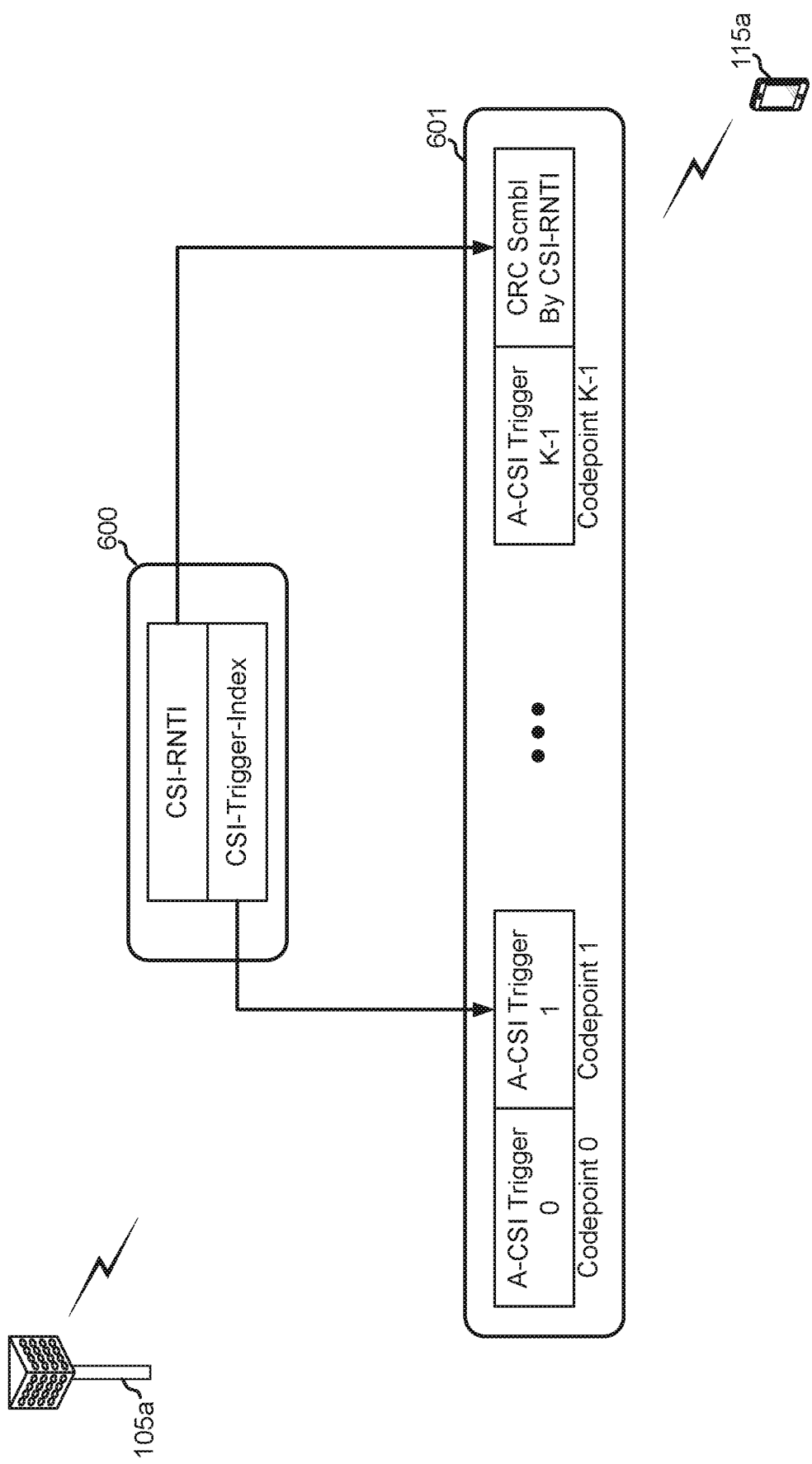
FIG. 6 is a block diagram illustrating a gNB and UE configured according to one aspect of the present disclosure.

FIG. 6 is a block diagram illustrating a gNB 105a and UE 115a configured according to one aspect of the present disclosure. As indicated in block 503, a group-common DCI 601 can be used to trigger A-CSI reporting on PUCCH for a group of UEs. UE 115a receives a CSI report configuration ID, such as A-CSI PUCCH configuration 600, from gNB 105a with at least one group ID which can be used to identify the group-common DCI. For example, A-CSI PUCCH configuration 600 configures UE 115a with a csi-RNTI via an RRC from gNB 105a, and the cyclic redundancy check (CRC) bits of group-common DCI 601 for requesting A-CSI from this UE 115a is scrambled by the csi-RNTI. A UE can be configured with at least one codepoint in the group-common DCI. For example, A-CSI PUCCH configuration 600 from gNB 105a configures UE 115a with a csi-Trigger-Index via RRC. The csi-Trigger-Index corresponds to a codepoint in group-common DCI 601. The A-CSI trigger associated with the codepoint is used for requesting A-CSI reporting for UE 115a. UE 115a monitors group-common DCI 601 based on the configured csi-RNTI of A-CSI PUCCH configuration 600 and the A-CSI trigger associated with the configured csi-Trigger-Index. The A-CSI PUCCH configuration 600 may be associated with a CSI reporting setting, if multiple CSI reporting settings are configured to UE 115a. Each A-CSI trigger of group-common DCI 601 includes at least following information: An indication of A-CSI request, e.g., a 1-bit field with 0 for no A-CSI report and 1 for A-CSI report.

Figure 7:
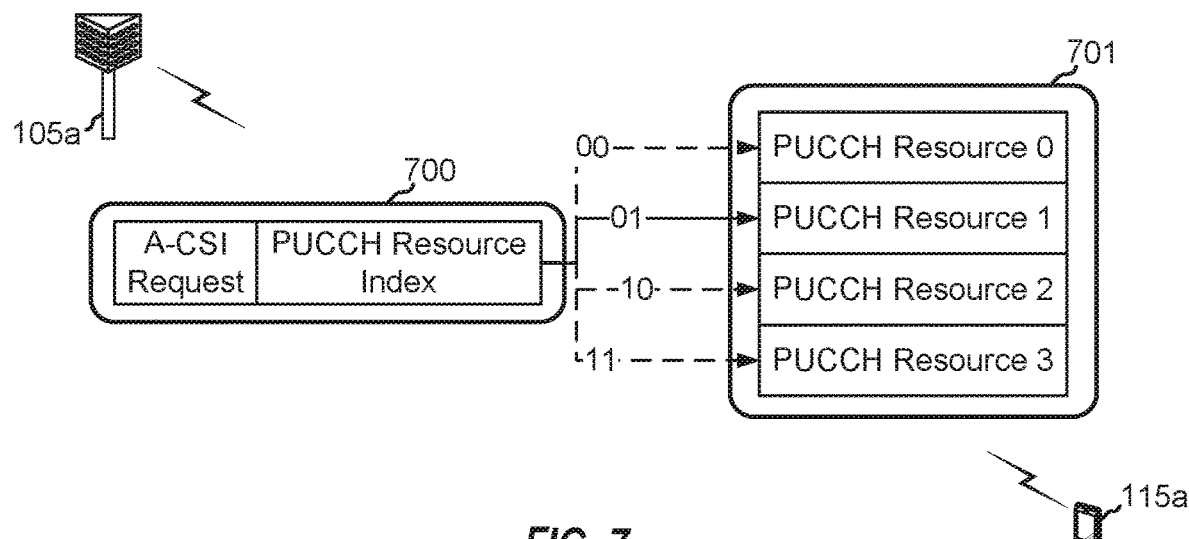
FIG. 7 is a block diagram illustrating a gNB and UE configured according to one aspect of the present disclosure.

FIG. 7 is a block diagram illustrating gNB 105a and UE 115a configured according to one aspect of the present disclosure. If a set of PUCCH resources 701 is semi-statically configured, an A-CSI trigger 700 may further include an indication of one PUCCH resource within the configured PUCCH resource set. Thus, A-CSI trigger 700 transmitted to UE 115a from gNB 105a includes the A-CSI request and a PUCCH resource index, which identifies which of PUCCH resources 701 that UE 115a has been configured for is selected for the A-CSI reporting.

Figure 8:
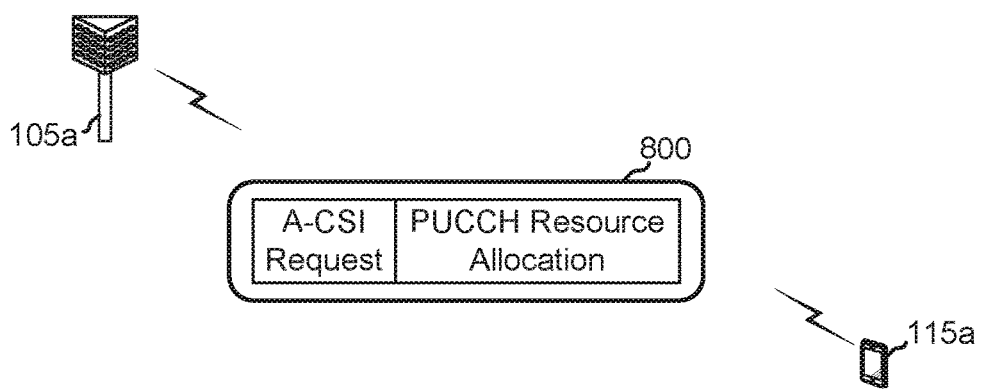
FIG. 8 is a block diagram illustrating a gNB and UE configured according to one aspect of the present disclosure.

FIG. 8 is a block diagram illustrating gNB 105a and UE 115a configured according to one aspect of the present disclosure. If the PUCCH resource is dynamically allocated, an A-CSI trigger 800 would include the A-CSI request and a PUCCH resource allocation. The PUCCH resource allocation would, itself, include e.g., timing offset between the PUCCH resource and the slot in which A-CSI trigger 800 is received, and a resource element location of the PUCCH resource. Thus, for dynamic allocation, A-CSI trigger 800 sent by gNB 105a to UE 115a includes the A-CSI request and a PUCCH resource allocation which identifies the specific allocation information noted above.

It should be noted that, at least for HARQ-ACK transmission, a set of PUCCH resources may be configured by higher layer signaling. An indication in the DCI may be used to select a PUCCH resource within the configured set.

If the CSI reporting is split into multiple PUCCH reports using multiple slots, either the same or different PUCCH resource may be used from slot to slot. In a first optional operation, a single PUCCH resource may be indicated/allocated in the DCI, where the UE uses the same resource for multiple slots if the PUCCH reporting is split into multiple reports. For example, referring back to FIG. 6, the allocation of the single PUCCH resource for use in the multiple slot transmission of the A-CSI feedback would be included in group-common DCI 601 at the codepoint(s) assigned to UE 115a.

In a second optional operation, a starting PUCCH resource may be indicated in the DCI, where the UE follows a pre-defined PUCCH resource hopping pattern to pick up PUCCH resources in the configured set of PUCCH resources. For example, group-common DCI would indicate the starting resource element for the PUCCH. UE 115a would then report A-CSI beginning at this PUCCH starting location. In the subsequent slots for transmission, UE 115a would use the predetermined hopping pattern for PUCCH resources.

In a third optional operation, the hopping pattern noted in the second optional operation can be dynamically indicated as part of the CSI-trigger. Multiple PUCCH resource hopping patterns can be configured via RRC or medium access control (MAC) control element (CE). One of those patterns may be indicated by the DCI, such as through a field in the CSI trigger, or the hopping pattern can be separately indicated. For example, group-common DCI would include the beginning location of the PUCCH resource and an indication of the hopping pattern to be used. This hopping pattern indication may be located at A-CSI Trigger 1 as allocated to UE 115a at codepoint 1.

Figure 9:
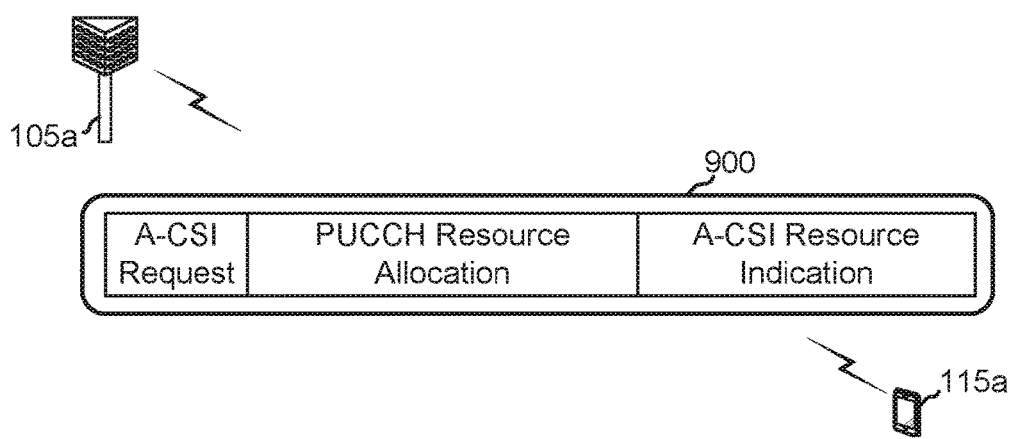
FIG. 9 is a block diagram illustrating a gNB and UE configured according to one aspect of the present disclosure.

FIG. 9 is a block diagram illustrating gNB 105a and UE 115a configured according to one aspect of the present disclosure. If A-CSI reporting is based on aperiodic CSI-RS (A-CSI-RS), an A-CSI trigger 900 may include the A-CSI request, the PUCCH resource allocation, and further include an A-CSI-RS resource indication of one of the A-CSI-RS resources within the configured CSI-RS resources. Such an indication of A-CSI-RS resource may include an indication of the resource setting which contains the CSI-RS resource; and/or an indication of, within a resource setting, the CSI-RS resource set which contains the CSI-RS resource; and/or an indication of the CSI-RS resource within a resource setting and/or CSI-RS resource set.

Figure 10:
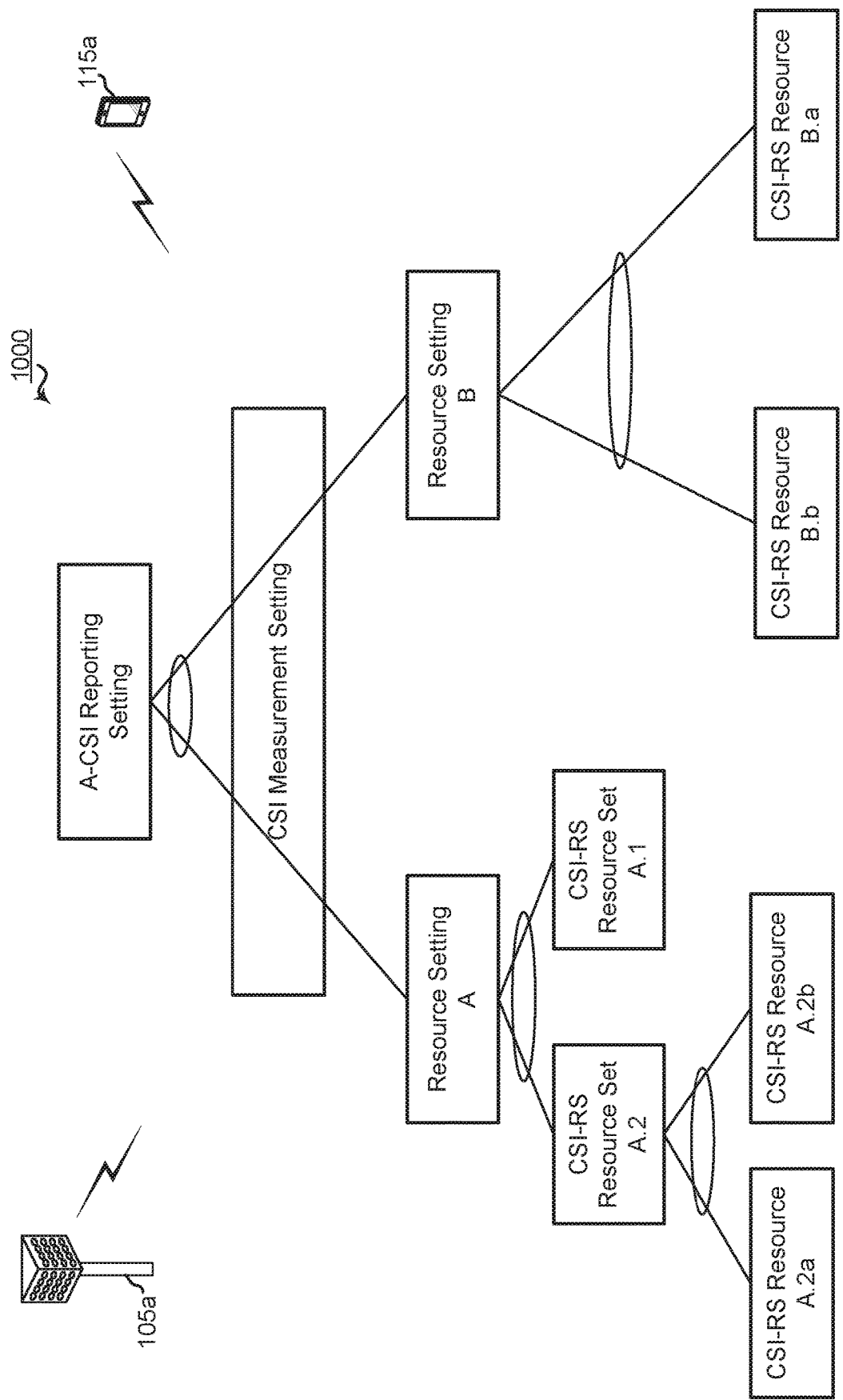
FIG. 10 is a block diagram illustrating a gNB and UE configured according to one aspect of the present disclosure.

FIG. 10 is a block diagram illustrating gNB 105a and UE 115a configured according to one aspect of the present disclosure. The A-CSI feedback communications between gNB 105a and UE 115a may include a number of different A-CSI reporting levels 1000 of configuration and settings. The highest level of setting includes the A-CSI reporting setting, which identifies the configurations for A-CSI reporting. The next level provides CSI measurement settings, which identifying the measurement settings for processing the A-CSI feedback. The following level defines the sets of resource settings, which may define only specific CSI-RS resources or CSI-RS resource sets and the specific CSI-RS resources associated with the resource sets.

Figure 11:
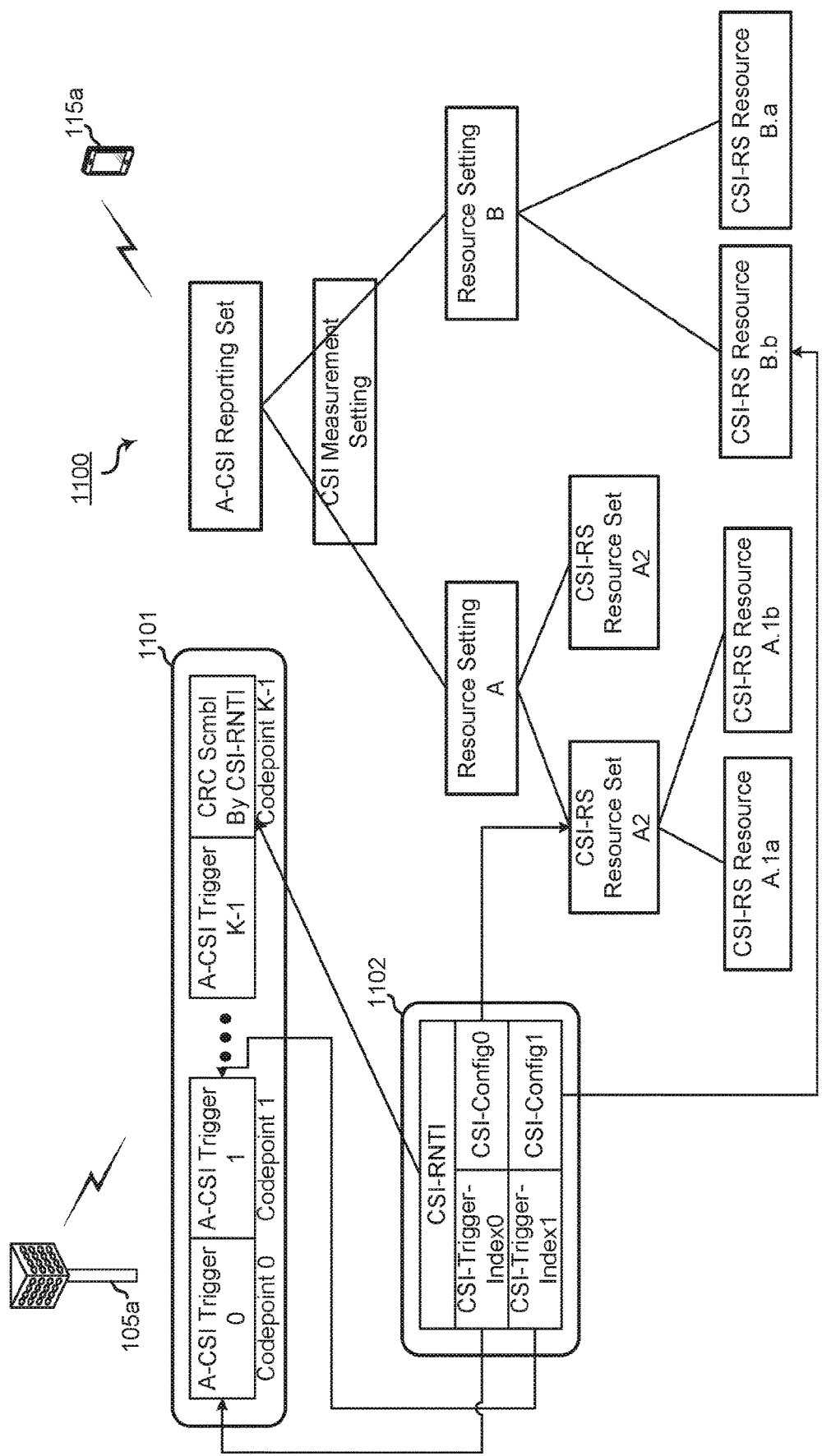
FIG. 11 is a block diagram illustrating a gNB and UE configured according to one aspect of the present disclosure.

FIG. 11 is a block diagram illustrating gNB 105a and UE 115a configured according to one aspect of the present disclosure. UE 115a can be configured by gNB 105a with for example, two or more codepoints, corresponding to two or more different CSI-RS resource sets or two different CSI-RS resources within a CSI-RS resource set. This allows implicit indication of the CSI-RS resource(s) used for CSI reporting to gNB 105a. gNB 105a transmits A-CSI PUCCH configuration 1102 to UE 115a. A-CSI PUCCH configuration 1102 includes multiple CSI trigger indices that point UE 115a to multiple codepoints in group common DCI 1101. For example, the CSI trigger indices in A-CSI PUCCH configuration 1102 points UE 115a to codepoint 0 and codepoint 1. Further, A-CSI PUCCH configuration 1102 includes multiple CSI configuration identifier (e.g., csi- Config0 or csi-Config1) that identify a CSI-RS resource set or sets, a CSI-RS resource, or other such reporting set levels of reporting set 1100. In the illustrated example, csi-Config0 points UE 115a to CSI-RS resource set A2, while csi-Config1 points UE 115a to CSI-RS resource B.b. A-CSI PUCCH configuration 1102 may be associated with various different CSI reporting settings.

The CSI group can be associated with one or multiple component carriers (CCs) and/or bandwidth parts (BPs). The group csi-RNTI can be CC-specific or BP-specific (one group for one CC or BP). For example, the CSI-RNTI within A-CSI PUCCH configuration 1102 may be associated with one or multiple CCs or BPs. A downlink configuration signal for PUCCH-reporting may be associated with a set of CCs or BPs. For instance, within group common DCI 1101, the A-CSI triggers associated with UE 115a (A-CSI Trigger 0 and A-CSI Trigger 1) may include an identifier that identifies a particular set or subset of CCs or BPs. If the CSI trigger contains such identifiers of a subset of CCs or BPs associated with the configuration, the A-CSI reporting can be triggered for the indicated CCs/BPs using the PUCCH resources configured/indicated for the corresponding CCs/BPs. However, if the CSI trigger does not contain any identifier of CCs/BPs, the implication is that A-CSI reporting for all CCs/BPs in the set may be triggered. The CSI configuration signal (e.g., A-CSI PUCCH configuration 1102) can be an identifier for various levels of reporting set 1100, such as a CSI-RS resource set, a CSI-RS resource, etc.

Figure 12:
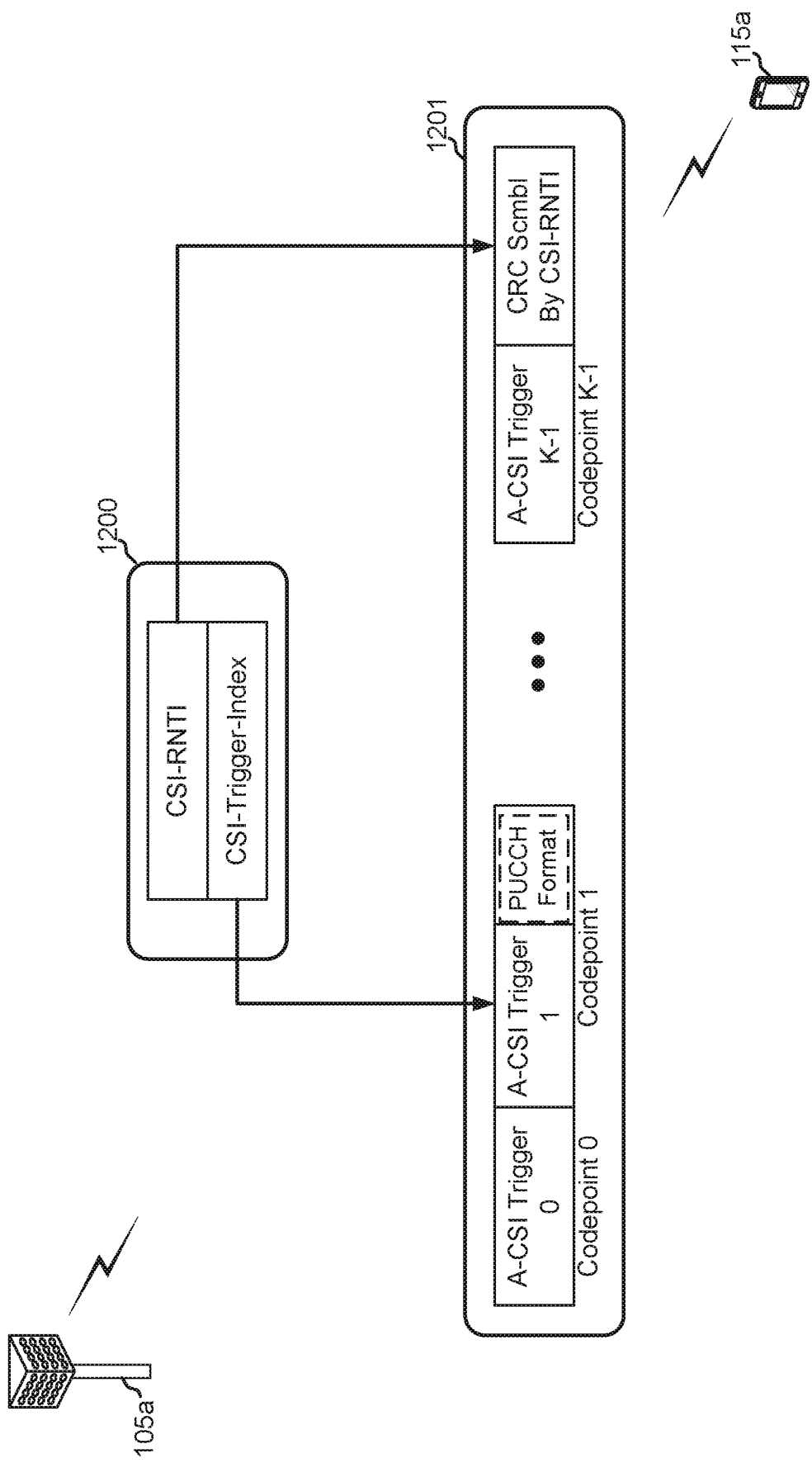
FIG. 12 is a block diagram illustrating a gNB and UE configured according to one aspect of the present disclosure.

FIG. 12 is a block diagram illustrating gNB 105a and UE 115a configured according to one aspect of the present disclosure. A-CSI group-common PDCCH can be separately configured. gNB 105a sends A-CSI PUCCH configuration 1200 to UE 11a to provide a CSI-RNTI for unscrambling the CRC of group common DCI 1201, and the CSI-Trigger index for identifying which codepoint in group common DCI 1201 is allocated to UE 115a. Within the A-CSI trigger for UE 115a (A-CSI Trigger 1 of codepoint 1) a PUCCH format is included for UE 115a. For short PUCCH and long PUCCH, at least one configuration may be defined for A-CSI reporting using short PUCCH, and at least one configuration for A-CSI reporting using a long PUCCH. For different PUCCH formats, a first option would allow at least one configuration for each format, while, in a second option, the PUCCH format may be semi-statically configured, which may include a field to indicate the PUCCH format. Such PUCCH formats may be included within the PUCCH format field of A-CSI Trigger 1 for UE 115a.

One group-common DCI, such as group common DCI 1201, can be used for both short and long PUCCH based A-CSI reporting. A PUCCH format may further be either indicated in the CSI trigger or associated with the codepoint semi-statically. Thus, as indicated by the PUCCH format field of A-CSI Trigger 1, A-CSI Trigger 1 may further include an indication of a subset of CSI-RS ports which UE 115a may use for channel measurement, and/or a subset of CSI-RS ports which UE 115a may use for interference measurement. In another example, such as A-CSI Trigger 0 of codepoint 0, instead of the explicit port indication, the UE allocated to codepoint 0 may be associated with a particular subset of CSI-RS ports.

It should be noted that one of skill in the art would recognize that a subset of CSI-RS ports may include a CSI-RS resource set which includes one or more CSI-RS resources, each of which CSI-RS resource may include one or more CSI-RS ports, a subset of CSI-RS ports in a given CSI-RS resource, or a subset of CSI-RS ports in a CSI-RS resource set. The CSI-RS ports of which a subset is defined may include any number of resources or resource sets that include an identifiable indication of CSI-RS ports.

Figure 13:
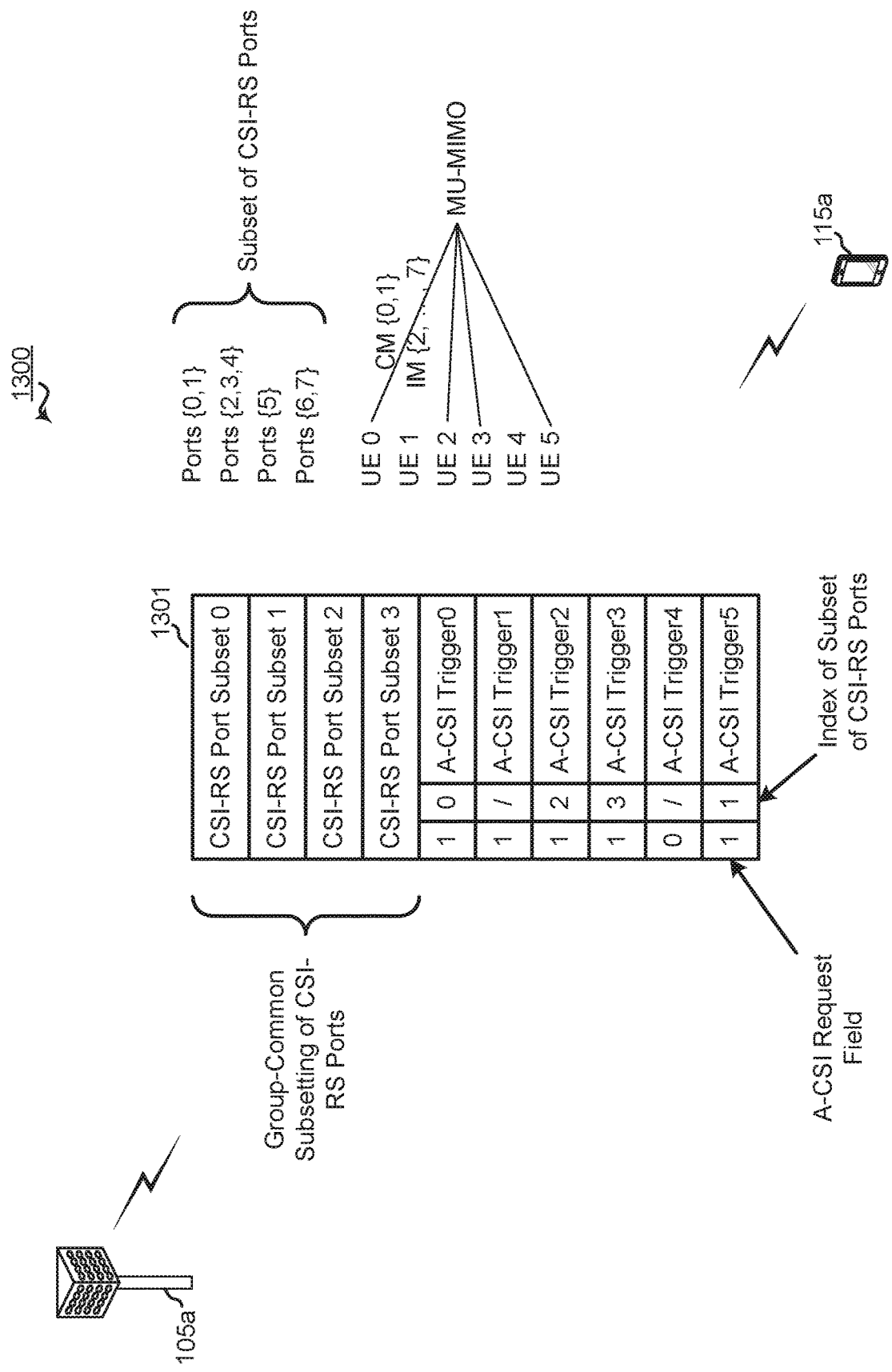
FIG. 13 is a block diagram illustrating a gNB and UE configured according to one aspect of the present disclosure.

FIG. 13 is a block diagram illustrating gNB 105a and UE 115a configured according to one aspect of the present disclosure. Group-common A-CSI DCI 1301 from gNB 105a can be used to trigger non-zero power (NZP) CSI-RS-based channel (CM) and interference measurement (IM). The A-CSI trigger may include a subset of CSI-RS ports which UE 115a may use for channel measurement; and/or a subset of CSI-RS ports which UE 115a may use for interference measurement. A common subsetting of CSI-RS ports can be shared by multiple A-CSI triggers in the same group-common DCI 1301. The A-CSI request field in each A-CSI trigger may be omitted if the number of CSI-RS port subsets equals to the number of A-CSI triggers.

The A-CSI request may be either implicitly indicated, e.g., if UE 115a detects a group-common DCI for NZP-CSI-RS based channel/interference measure, it may report A-CSI; or jointly encoded with the CSI-RS subset index. For the example as shown FIG. 13, if UE 115a is configured with an X-port CSI-RS resource and X>8, UE 115a may assume that the CSI-RS ports not in the CSI-RS subsets are not transmitted. That means group-common DCI 1301 can also be used to indicate partial ZP (or partial NZP) CSI-RS resource, such that, for an X-port CSI-RS resource, there are Y ports not transmitted. UE 115a may adjust the PDSCH energy per resource element (EPRE) to CSI-RS EPRE ratio dynamically based on the partial ZP indication.

Figures 14A, 14B:
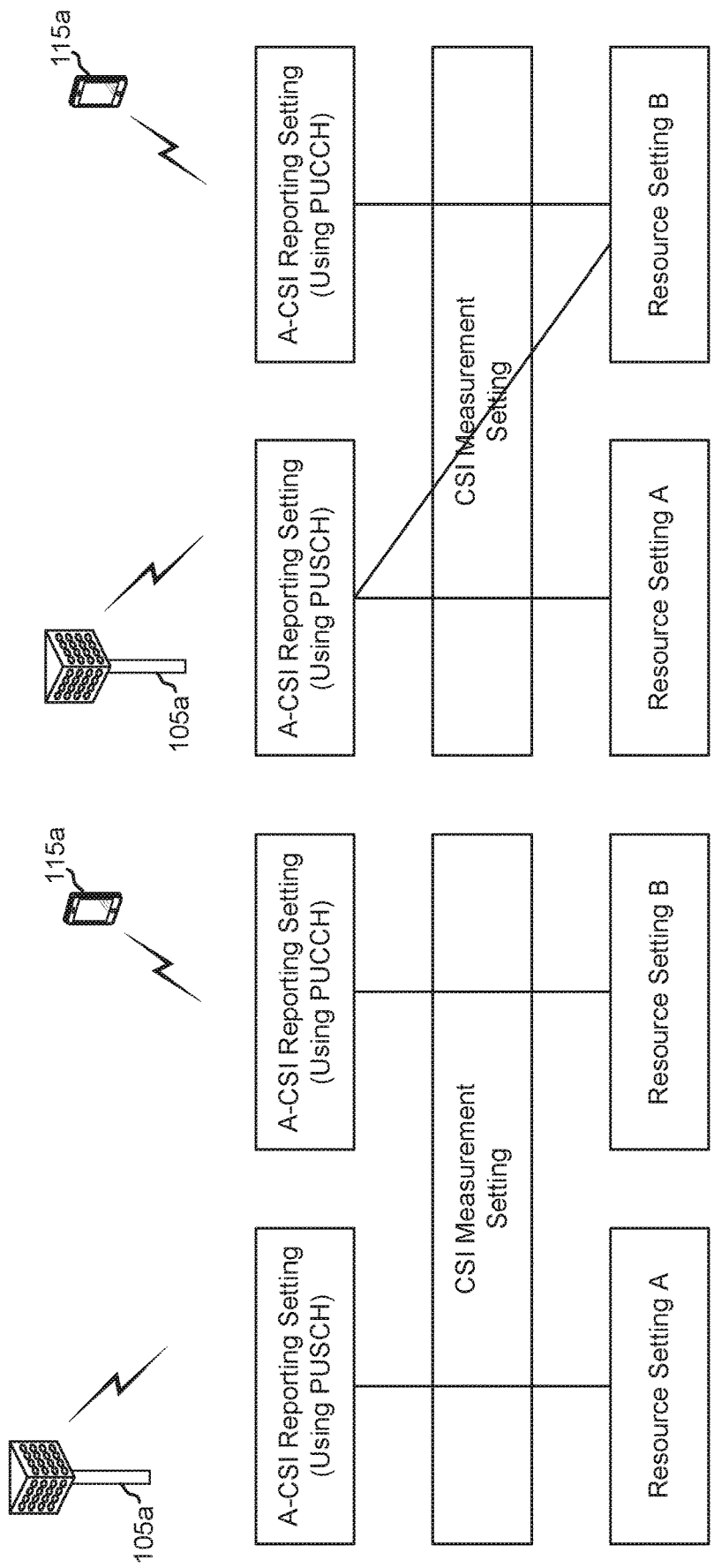
FIGS. 14A-14C are block diagrams illustrating a gNB and UE configured according to aspects of the present disclosure.
Figure 14C:
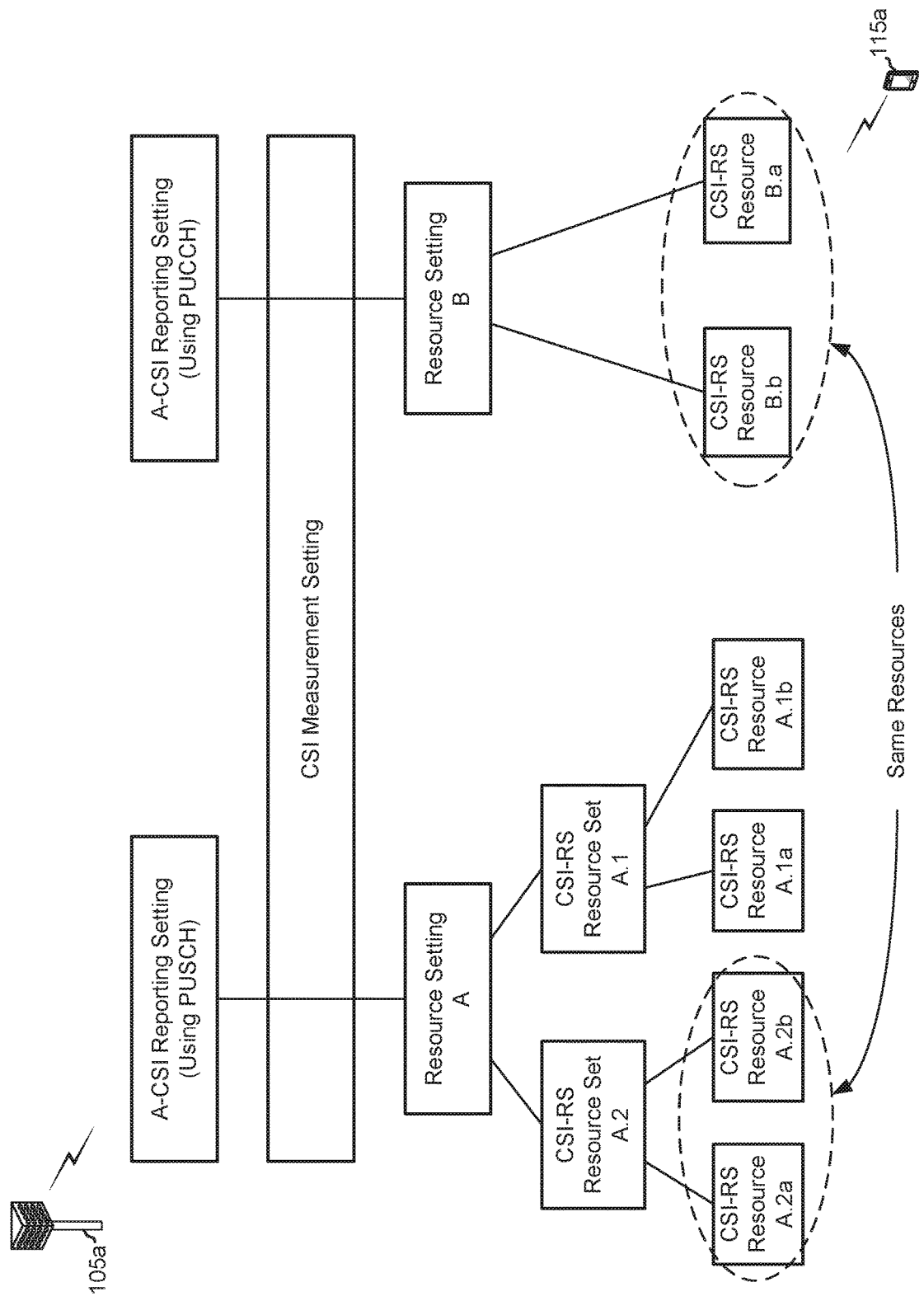

FIGS. 14A-14C are block diagrams illustrating gNB 105a and UE 115a configured according to aspects of the present disclosure. If UE 115a is configured by gNB 105a with both PUSCH and PUCCH-based A-CSI reporting, the set of A-CSI-RS resources for each reporting can be independently configured. FIG. 14A represents independent configuration in which PUSCH-based settings are configured for different resource settings than PUCCH-based settings. FIG. 14B represents an alternative, in which the set of A-CSI-RS resources for PUCCH based reporting can be a subset of the resources for PUSCH based A-CSI reporting. Moreover, as illustrated by FIG. 14C, the independent configurations of PUSCH and PUCCH-based reporting may identify resources that are actually the same resources.

When collisions between PUCCH-based A-CSI reporting and PUSCH-based A-CSI reporting occur, the PUCCH-based A-CSI reporting may be dropped. If there are no overlapping on the associated uplink symbols, the UE may report both. When collisions between PUCCH-based A-CSI reporting and PUCCH-based P-CSI reporting occur, the PUCCH-based P-CSI reporting may be dropped since A-CSI generally has higher priority than P-CSI.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Various additional aspects of the present disclosure may be described as follows:

A first aspect includes a non-transitory computer-readable medium having program code recorded thereon, the program code comprising:

program code executable by a computer for causing the computer to receive, by a user equipment (UE), a feedback configuration to report aperiodic channel state information (A-CSI) feedback using a physical uplink control channel (PUCCH);

program code executable by the computer for causing the computer to receive, by the UE, a CSI trigger to report A-CSI feedback, wherein the CSI trigger includes one of: a dedicated downlink control indicator (DCI) for the A-CSI feedback or a group common DCI;

program code executable by the computer for causing the computer to determine, by the UE, channel condition information associated with the A-CSI feedback in response to the CSI trigger; and program code executable by the computer for causing the computer to report, by the UE to a base station, the A-CSI feedback using the PUCCH.

The second aspect of the non-transitory computer-readable medium based on the first aspect,
wherein the CSI trigger includes the dedicated DCI, and
wherein PUCCH resources allocated for the A-CSI feedback include one of:
acknowledgement feedback resources; or
semi-statically configured resources.

The third aspect of the non-transitory computer-readable medium based on the first aspect,
wherein the CSI trigger includes the group common DCI, and
wherein PUCCH resources allocated for the A-CSI feedback include one of:
semi-statically configured resources; or
dynamically indicated resources.

The fourth aspect of the non-transitory computer-readable medium based on the third aspect, further including:
program code executable by the computer for causing the computer to identify, by the UE, the group common DCI using a group identifier received with the feedback configuration; and
program code executable by the computer for causing the computer to identify, by the UE, one or more codepoints of the group common DCI assigned to the UE, wherein the one or more codepoints are identified using a trigger index received with the feedback configuration.

The fifth aspect of the non-transitory computer-readable medium based on the first aspect, wherein the CSI trigger includes:
an A-CSI request indication;
a CSI report configuration identifier (ID); and at least one of:
an index of one of a plurality of PUCCH resources configured for the UE; and
an allocation of PUCCH resources for the A-CSI feedback, wherein the allocation includes at least one of a starting location of the PUCCH resources and a timing offset between the PUCCH resources and a slot in which the trigger is received.

The sixth aspect of the non-transitory computer-readable medium based on the fifth aspect, wherein the CSI trigger further includes:
a number of CSI reference signal (CSI-RS) port subsets.

The seventh aspect of the non-transitory computer-readable medium based on the sixth aspect, further including:
program code executable by the computer for causing the computer to omit the A-CSI request indication from the CSI trigger when the number of CSI-RS port subsets equals a number of A-CSI requests.

The eighth aspect of the non-transitory computer-readable medium based on the fifth aspect, wherein the A-CSI request is one of:
implicitly indicated when the UE detects the group common DCI for non-zero power CSI-RS (NZP-CSI-RS)-based channel measurement and interference measurement; or
jointly encoded with a CSI-RS port index.

The ninth aspect of the non-transitory computer-readable medium based on the fifth aspect, wherein the program code executable by the computer for causing the computer to report includes:
program code executable by the computer for causing the computer to divide the A-CSI feedback into a plurality of A-CSI reports for transmission over a plurality of slots; and
program code executable by the computer for causing the computer to transmit each report of the plurality of A-CSI reports in a corresponding slot of the plurality of slots using a same PUCCH resource identified in the CSI trigger in each of the plurality of slots.

The tenth aspect of the non-transitory computer-readable medium based on the first aspect, wherein the program code executable by the computer for causing the computer to report includes:
program code executable by the computer for causing the computer to divide the A-CSI feedback into a plurality of A-CSI reports for transmission over a plurality of slots; and
program code executable by the computer for causing the computer to transmit each report of the plurality of A-CSI reports over a configured set of PUCCH resources beginning at a first PUCCH resource identified in the CSI trigger and using a hopping pattern after the first PUCCH resource.

The eleventh aspect of the non-transitory computer-readable medium based on the tenth aspect, wherein CSI trigger includes a hopping pattern indicator identifying the hopping pattern.

The twelfth aspect of the non-transitory computer-readable medium based on the eleventh aspect,
wherein the feedback configuration includes configuration of a set of PUCCH resource hopping patterns, and
wherein the hopping pattern indicator identifies the hopping pattern from the set of PUCCH resource hopping patterns.

The thirteenth aspect of the non-transitory computer-readable medium based on the first aspect, wherein the CSI trigger includes an indication of a A-CSI reference signal (A-CSI-RS) within a set of configured CSI-RS resources, wherein the indication includes one of:
an indication of a resource setting which contains the CSI-RS resources; or
an indication of, within a resource setting, the CSI-RS resource set which contains the CSI-RS resource; or an indication of the CSI-RS resource within a resource setting or CSI-RS resource set.

The fourteenth aspect of the non-transitory computer-readable medium based on the first aspect, wherein the feedback configuration includes configuration of two or more codepoints for the UE corresponding to two or more different CSI-RS resource sets or two or more different CSI-RS resources within a CSI-RS resource set.

The fifteenth aspect of the non-transitory computer-readable medium based on the fourteenth aspect, wherein the feedback configuration further includes:
an A-CSI configuration identifier identifying a resource setting, a CSI-RS resource set of the resource setting, a CSI-RS resource of the CSI-RS resource set.

The sixteenth aspect of the non-transitory computer-readable medium based on the first aspect, wherein a CSI group corresponding to the group common DCI is associated with one of: one or more component carriers (CCs) or one or more bandwidth parts (BPs) within one or more CCs The seventeenth aspect of the non-transitory computer-readable medium based on the sixteenth aspect, wherein the feedback configuration is associated with one of: a set of CCs or a set of BPs.

The eighteenth aspect of the non-transitory computer-readable medium based on the seventeenth aspect, further including:
program code executable by the computer for causing the computer to review, by the UE, the CSI trigger for one or more identifiers identifying one of: a set of CCs or a set of BPs, associated with the feedback configuration, wherein the reporting the A-CSI feedback includes:
program code executable by the computer for causing the computer to report the A-CSI feedback for each of the one of: the set of CCs or the set of BPs using a set of PUCCH resources configured for the one of: the set of CCs or the set of BPs; and
program code executable by the computer for causing the computer to report the A-CSI feedback for one of all CCs or all BPs when the UE fails to detect the identifiers.

The nineteenth aspect of the non-transitory computer-readable medium based on the first aspect, wherein the group common DCI includes a PUCCH configuration for A-CSI reporting using one of:
a short PUCCH;
a long PUCCH; and
different PUCCH formats, wherein the different PUCCH formats include one of:
at least one PUCCH format for each of the different PUCCH formats; or
a PUCCH format configuration including an indicator field identifying each of the different PUCCH formats.

The twentieth aspect of the non-transitory computer-readable medium based on the first aspect, wherein the UE uses a PUCCH configuration for A-CSI reporting for both a short PUCCH and a long PUCCH, wherein the PUCCH configuration is identified by one of: the CSI trigger, or a codepoint allocated to the UE that is associated with the PUCCH configuration.

The twenty-first aspect of the non-transitory computer-readable medium based on the first aspect, wherein the CSI trigger includes a CSI-RS port indicator indicating at least one of:
a subset of channel CSI-RS ports configured for channel measurement; and
a subset of interference CSI-RS ports configured for interference measurement.

The twenty-second aspect of the non-transitory computer-readable medium based on the first aspect, wherein the CSI trigger includes identification of a subset of CSI-RS ports for channel measurement and interference measurement, wherein the subset of CSI-RS ports may be shared with additional CSI triggers of the group common DCI.

The twenty-third aspect of the non-transitory computer-readable medium based on the first aspect, further including:
program code executable by the computer for causing the computer to receive, by the UE, an additional feedback configuration to also report A-CSI feedback using a physical uplink shared channel (PUSCH), wherein feedback resources for the feedback configuration and the additional feedback configuration are one of:
independently configured; or
the feedback resources of the feedback configuration are a subset of the feedback resources of the additional feedback configuration.

The twenty-fourth aspect of the non-transitory computer-readable medium based on the twenty-third aspect, further including:
program code executable by the computer for causing the computer to detect, by the UE, a collision between the A-CSI feedback using the PUCCH and the A-CSI feedback using the PUSCH;
program code executable by the computer for causing the computer to drop the A-CSI feedback on the PUCCH in response to the collision when associated uplink symbols of the A-CSI feedback overlap between the PUSCH and the PUCCH; and
program code executable by the computer for causing the computer to report the A-CSI feedback on both the PUCCH and the PUSCH when the associated uplink symbols of the A-CSI feedback do not overlap between the PUSCH and the PUCCH.

The twenty-fifth aspect of the non-transitory computer-readable medium based on the twenty-third aspect, further including:
program code executable by the computer for causing the computer to detect, by the UE, a collision between the A-CSI feedback using the PUCCH and a periodic CSI (P-CSI) feedback using the PUCCH; and
program code executable by the computer for causing the computer to drop the P-CSI feedback using the PUCCH.

The twenty-sixth aspect of the non-transitory computer-readable medium based on the first aspect, further including:
program code executable by the computer for causing the computer to detect, by the UE, a collision between one of: a P-CSI or A-CSI feedback using the PUCCH, and one or more of: hybrid automatic repeat request (HARQ) acknowledgement (HARQ-ACK) or scheduling request (SR) feedback using the PUCCH; and
program code executable by the computer for causing the computer to drop one of: the P-CSI or A-CSI feedback using the PUCCH.

The twenty-seventh aspect of the non-transitory computer-readable medium of any combination of the first through twenty-sixth.

A twenty-eighth aspect is an apparatus configured for wireless communication, the apparatus comprising:
at least one processor; and
a memory coupled to the at least one processor,
wherein the at least one processor is configured:
to receive, by a user equipment (UE), a feedback configuration to report aperiodic channel state information (A-CSI) feedback using a physical uplink control channel (PUCCH);
to receive, by the UE, a CSI trigger to report A-CSI feedback, wherein the CSI trigger includes one of: a dedicated downlink control indicator (DCI) for the A-CSI feedback or a group common DCI;
to determine, by the UE, channel condition information associated with the A-CSI feedback in response to the CSI trigger; and
to report, by the UE to a base station, the A-CSI feedback using the PUCCH.

The twenty-ninth aspect of the apparatus based on the twenty-eighth aspect includes,
wherein the CSI trigger includes the dedicated DCI, and
wherein PUCCH resources allocated for the A-CSI feedback include one of:
acknowledgement feedback resources; or
semi-statically configured resources.

The thirtieth aspect of the apparatus based on the twenty-eighth aspect includes, wherein the CSI trigger includes the group common DCI, and wherein PUCCH resources allocated for the A-CSI feedback include one of:

semi-statically configured resources; or dynamically indicated resources.

The thirty-first aspect of the apparatus based on the thirtieth aspect includes, further including configuration of the at least one processor:

to identify, by the UE, the group common DCI using a group identifier received with the feedback configuration; and to identify, by the UE, one or more codepoints of the group common DCI assigned to the UE, wherein the one or more codepoints are identified using a trigger index received with the feedback configuration.

The thirty-second aspect of the apparatus based on the twenty-eighth aspect includes, wherein the CSI trigger includes:

an A-CSI request indication;

a CSI report configuration identifier (ID); and at least one of:

an index of one of a plurality of PUCCH resources configured for the UE; and an allocation of PUCCH resources for the A-CSI feedback, wherein the allocation includes at least one of a starting location of the PUCCH resources and a timing offset between the PUCCH resources and a slot in which the trigger is received.

The thirty-third aspect of the apparatus based on the thirty-second aspect includes, wherein the CSI trigger further includes:

a number of CSI reference signal (CSI-RS) port subsets.

The thirty-fourth aspect of the apparatus based on the thirty-third aspect includes, further including configuration of the at least one processor to omit the A-CSI request indication from the CSI trigger when the number of CSI-RS port subsets equals a number of A-CSI requests.

The thirty-fifth aspect of the apparatus based on the thirty-second aspect includes, wherein the A-CSI request is one of:

implicitly indicated when the UE detects the group common DCI for non-zero power CSI-RS (NZP-CSI-RS)-based channel measurement and interference measurement; or jointly encoded with a CSI-RS port index.

The thirty-sixth aspect of the apparatus based on the twenty-eighth aspect includes, wherein the configuration of the at least one processor to report includes configuration of the at least one processor:

to divide the A-CSI feedback into a plurality of A-CSI reports for transmission over a plurality of slots; and to transmit each report of the plurality of A-CSI reports in a corresponding slot of the plurality of slots using a same PUCCH resource identified in the CSI trigger in each of the plurality of slots.

The thirty-seventh aspect of the apparatus based on the twenty-eighth aspect includes, wherein the configuration of the at least one processor to report includes configuration of the at least one processor:

to divide the A-CSI feedback into a plurality of A-CSI reports for transmission over a plurality of slots; and to transmit each report of the plurality of A-CSI reports over a configured set of PUCCH resources beginning at a first PUCCH resource identified in the CSI trigger and using a hopping pattern after the first PUCCH resource.

The thirty-eighth aspect of the apparatus based on the thirty-seventh aspect includes, wherein CSI trigger includes a hopping pattern indicator identifying the hopping pattern.

The thirty-ninth aspect of the apparatus based on the thirty-eighth aspect includes, wherein the feedback configuration includes configuration of a set of PUCCH resource hopping patterns, and wherein the hopping pattern indicator identifies the hopping pattern from the set of PUCCH resource hopping patterns.

The fortieth aspect of the apparatus based on the twenty-eighth aspect includes, wherein the CSI trigger includes an indication of a A-CSI reference signal (A-CSI-RS) within a set of configured CSI-RS resources, wherein the indication includes one of:

an indication of a resource setting which contains the CSI-RS resources; or an indication of, within a resource setting, the CSI-RS resource set which contains the CSI-RS resource; or an indication of the CSI-RS resource within a resource setting or CSI-RS resource set.

The forty-first aspect of the apparatus based on the twenty-eighth aspect includes, wherein the feedback configuration includes configuration of two or more codepoints for the UE corresponding to two or more different CSI-RS resource sets or two or more different CSI-RS resources within a CSI-RS resource set.

The forty-second aspect of the apparatus based on the forty-first aspect includes, wherein the feedback configuration further includes:

an A-CSI configuration identifier identifying a resource setting, a CSI-RS resource set of the resource setting, a CSI-RS resource of the CSI-RS resource set.

The forty-third aspect of the apparatus based on the twenty-eighth aspect includes, wherein a CSI group corresponding to the group common DCI is associated with one of: one or more component carriers (CCs) or one or more bandwidth parts (BPs) within one or more CCs The forty-fourth aspect of the apparatus based on the forty-third aspect includes, wherein the feedback configuration is associated with one of: a set of CCs or a set of BPs.

The forty-fifth aspect of the apparatus based on the forty-fourth aspect includes, further including configuration of the at least one processor to review, by the UE, the CSI trigger for one or more identifiers identifying one of: a set of CCs or a set of BPs, associated with the feedback configuration, wherein the reporting the A-CSI feedback includes configuration of the at least one processor:

to report the A-CSI feedback for each of the one of: the set of CCs or the set of BPs using a set of PUCCH resources configured for the one of: the set of CCs or the set of BPs; and to report the A-CSI feedback for one of all CCs or all BPs when the UE fails to detect the identifiers.

The forty-sixth aspect of the apparatus based on the twenty-eighth aspect includes, wherein the group common DCI includes a PUCCH configuration for A-CSI reporting using one of:

a short PUCCH;

a long PUCCH; and different PUCCH formats, wherein the different PUCCH formats include one of:

at least one PUCCH format for each of the different PUCCH formats; or a PUCCH format configuration including an indicator field identifying each of the different PUCCH formats.

The forty-seventh aspect of the apparatus based on the twenty-eighth aspect includes, wherein the UE uses a PUCCH configuration for A-CSI reporting for both a short PUCCH and a long PUCCH, wherein the PUCCH configuration is identified by one of: the CSI trigger, or a codepoint allocated to the UE that is associated with the PUCCH configuration.

The forty-eighth aspect of the apparatus based on the twenty-eighth aspect includes, wherein the CSI trigger includes a CSI-RS port indicator indicating at least one of:
  a subset of channel CSI-RS ports configured for channel measurement; and
  a subset of interference CSI-RS ports configured for interference measurement.

The forty-ninth aspect of the apparatus based on the twenty-eighth aspect includes, wherein the CSI trigger includes identification of a subset of CSI-RS ports for channel measurement and interference measurement, wherein the subset of CSI-RS ports may be shared with additional CSI triggers of the group common DCI.

The fiftieth aspect of the apparatus based on the twenty-eighth aspect includes, further including configuration of the at least one processor to receive, by the UE, an additional feedback configuration to also report A-CSI feedback using a physical uplink shared channel (PUSCH), wherein feedback resources for the feedback configuration and the additional feedback configuration are one of:
  independently configured; or
  the feedback resources of the feedback configuration are a subset of the feedback resources of the additional feedback configuration.

The fifty-first aspect of the apparatus based on the fiftieth aspect includes, further including configuration of the at least one processor:
  to detect, by the UE, a collision between the A-CSI feedback using the PUCCH and the A-CSI feedback using the PUSCH;
  to drop the A-CSI feedback on the PUCCH in response to the collision when associated uplink symbols of the A-CSI feedback overlap between the PUSCH and the PUCCH; and
  to report the A-CSI feedback on both the PUCCH and the PUSCH when the associated uplink symbols of the A-CSI feedback do not overlap between the PUSCH and the PUCCH.

The fifty-second aspect of the apparatus based on the fiftieth aspect includes, further including configuration of the at least one processor:
  to detect, by the UE, a collision between the A-CSI feedback using the PUCCH and a periodic CSI (P-CSI) feedback using the PUCCH; and
  to drop the P-CSI feedback using the PUCCH.

The fifty-third aspect of the apparatus based on the twenty-eighth aspect includes, further including configuration of the at least one processor:
  to detect, by the UE, a collision between one of: a P-CSI or A-CSI feedback using the PUCCH, and one or more of: hybrid automatic repeat request (HARQ) acknowledgement (HARQ-ACK) or scheduling request (SR) feedback using the PUCCH; and
  to drop one of: the P-CSI or A-CSI feedback using the PUCCH.

The fifty-fourth aspect of the apparatus includes any combination of the twenty-eighth though fifty-third aspects.

The functional blocks and modules in FIG. 5 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, by a user equipment (UE), a feedback configuration including a group identifier to report aperiodic channel state information (A-CSI) feedback using a physical uplink control channel (PUCCH);
   receiving, by the UE, a CSI trigger to report A-CSI feedback, wherein the CSI trigger includes a group common downlink control indicator (DCI);
   determining, by the UE, channel condition information associated with the A-CSI feedback in response to the CSI trigger; and
   reporting, by the UE to a base station, the A-CSI feedback using the PUCCH.

2. The method of claim 1,
   wherein PUCCH resources allocated for the A-CSI feedback include one of:
      semi-statically configured resources; or
      dynamically indicated resources.

3. The method of claim 2, further including:
   identifying, by the UE, the group common DCI using the group identifier; and
   identifying, by the UE, one or more codepoints of the group common DCI assigned to the UE, wherein the one or more codepoints are identified using a trigger index received with the feedback configuration.

4. The method of claim 1, wherein the CSI trigger includes:
   an A-CSI request indication;
   a CSI report configuration identifier (ID); and at least one of:
      an index of one of a plurality of PUCCH resources configured for the UE; and
      an allocation of PUCCH resources for the A-CSI feedback, wherein the allocation includes at least one of a starting location of the PUCCH resources and a timing offset between the PUCCH resources and a slot in which the trigger is received.

5. The method of claim 4, wherein the CSI trigger further includes:
   a number of CSI reference signal (CSI-RS) port subsets.

6. The method of claim 4, wherein the A-CSI request is one of:
   implicitly indicated when the UE detects the group common DCI for non-zero power CSI-RS (NZP-CSI-RS)-based channel measurement and interference measurement; or
   jointly encoded with a CSI-RS port index.

7. The method of claim 1, wherein the reporting includes:
   dividing the A-CSI feedback into a plurality of A-CSI reports for transmission over a plurality of slots; and
   transmitting each report of the plurality of A-CSI reports in a corresponding slot of the plurality of slots using a same PUCCH resource identified in the CSI trigger in each of the plurality of slots.

8. The method of claim 1, wherein the reporting includes:
   dividing the A-CSI feedback into a plurality of A-CSI reports for transmission over a plurality of slots; and
   transmitting each report of the plurality of A-CSI reports over a configured set of PUCCH resources beginning at a first PUCCH resource identified in the CSI trigger and using a hopping pattern after the first PUCCH resource.

9. The method of claim 8, wherein CSI trigger includes a hopping pattern indicator identifying the hopping pattern.

10. The method of claim 9,
    wherein the feedback configuration includes configuration of a set of PUCCH resource hopping patterns, and
    wherein the hopping pattern indicator identifies the hopping pattern from the set of PUCCH resource hopping patterns.

11. The method of claim 1, wherein the CSI trigger includes an indication of a A-CSI reference signal (A-CSI-RS) within a set of configured CSI-RS resources, wherein the indication includes one of:
    an indication of a resource setting which contains the CSI-RS resources; or
    an indication of, within a resource setting, the CSI-RS resource set which contains the CSI-RS resource; or
    an indication of the CSI-RS resource within a resource setting or CSI-RS resource set.

12. The method of claim 1, wherein the feedback configuration includes configuration of two or more codepoints for the UE corresponding to two or more different CSI-RS resource sets or two or more different CSI-RS resources within a CSI-RS resource set.

13. The method of claim 12, wherein the feedback configuration further includes:
    an A-CSI configuration identifier identifying a resource setting, a CSI-RS resource set of the resource setting, or a CSI-RS resource of the CSI-RS resource set.

14. The method of claim 1, wherein a CSI group corresponding to the group common DCI is associated with one of: one or more component carriers (CCs) or one or more bandwidth parts (BPs) within one or more CCs.

15. The method of claim 14, wherein the feedback configuration is associated with one of: a set of CCs or a set of BPs.

16. The method of claim 15, further including:
reviewing, by the UE, the CSI trigger for one or more identifiers identifying one of: a set of CCs or a set of BPs, associated with the feedback configuration, wherein the reporting the A-CSI feedback includes:
reporting the A-CSI feedback for each of the one of: the set of CCs or the set of BPs using a set of PUCCH resources configured for the one of: the set of CCs or the set of BPs; and
reporting the A-CSI feedback for one of all CCs or all BPs when the UE fails to detect the identifiers.

17. The method of claim 1, wherein the group common DCI includes a PUCCH configuration for A-CSI reporting using one of:
a short PUCCH;
a long PUCCH; and
different PUCCH formats, wherein the different PUCCH formats include one of:
at least one PUCCH format for each of the different PUCCH formats; or
a PUCCH format configuration including an indicator field identifying each of the different PUCCH formats.

18. The method of claim 1, wherein the UE uses a PUCCH configuration for A-CSI reporting for both a short PUCCH and a long PUCCH, wherein the PUCCH configuration is identified by one of: the CSI trigger, or a codepoint allocated to the UE that is associated with the PUCCH configuration.

19. The method of claim 1, wherein the CSI trigger includes a CSI-RS port indicator indicating at least one of:
a subset of channel CSI-RS ports configured for channel measurement; and
a subset of interference CSI-RS ports configured for interference measurement.

20. The method of claim 1, wherein the CSI trigger includes identification of a subset of CSI-RS ports for channel measurement and interference measurement, wherein the subset of CSI-RS ports may be shared with additional CSI triggers of the group common DCI.

21. The method of claim 1, further including:
receiving, by the UE, an additional feedback configuration to also report A-CSI feedback using a physical uplink shared channel (PUSCH), wherein feedback resources for the feedback configuration and the additional feedback configuration are one of:
independently configured; or
the feedback resources of the feedback configuration are a subset of the feedback resources of the additional feedback configuration.

22. The method of claim 21, further including:
detecting, by the UE, a collision between the A-CSI feedback using the PUCCH and the A-CSI feedback using the PUSCH;
dropping the A-CSI feedback on the PUCCH in response to the collision when associated uplink symbols of the A-CSI feedback overlap between the PUSCH and the PUCCH; and
reporting the A-CSI feedback on both the PUCCH and the PUSCH when the associated uplink symbols of the A-CSI feedback do not overlap between the PUSCH and the PUCCH.

23. The method of claim 21, further including:
detecting, by the UE, a collision between the A-CSI feedback using the PUCCH and a periodic CSI (P-CSI) feedback using the PUCCH; and
dropping the P-CSI feedback using the PUCCH.

24. The method of claim 1, further including:
detecting, by the UE, a collision between one of: a periodic channel state information (P-CSI) feedback or A-CSI feedback using the PUCCH, and one or more of: hybrid automatic repeat request (HARD) acknowledgement (HARQ-ACK) or scheduling request (SR) feedback using the PUCCH; and
dropping one of: the P-CSI or A-CSI feedback using the PUCCH.

25. An apparatus configured for wireless communication, comprising:
means for receiving, by a user equipment (UE), a feedback configuration to report aperiodic channel state information (A-CSI) feedback using a physical uplink control channel (PUCCH);
means for receiving, by the UE, a CSI trigger to report A-CSI feedback, wherein the CSI trigger includes one of: a dedicated downlink control indicator (DCI) for the A-CSI feedback or a group common DCI;
means for determining, by the UE, channel condition information associated with the A-CSI feedback in response to the CSI trigger; and
means for reporting, by the UE to a base station, the A-CSI feedback using the PUCCH, the means for reporting further includes:
means for dividing the A-CSI feedback into a plurality of A-CSI reports for transmission over a plurality of slots.

26. A non-transitory computer-readable medium having program code recorded thereon, the program code comprising:
program code executable by a computer for causing the computer to receive, by a user equipment (UE), a feedback configuration to report aperiodic channel state information (A-CSI) feedback using a physical uplink control channel (PUCCH);
program code executable by the computer for causing the computer to receive, by the UE, a CSI trigger to report A-CSI feedback, wherein the CSI trigger includes one of: a dedicated downlink control indicator (DCI) for the A-CSI feedback or a group common DCI;
program code executable by the computer for causing the computer to determine, by the UE, channel condition information associated with the A-CSI feedback in response to the CSI trigger; and
program code executable by the computer for causing the computer to report, by the UE to a base station, the A-CSI feedback using the PUCCH, wherein the program code executable by the computer for causing the computer to report further includes program code executable by the computer for causing the computer to:
divide the A-CSI feedback into a plurality of A-CSI reports for transmission over a plurality of slots.

27. An apparatus configured for wireless communication, the apparatus comprising:
at least one processor; and
a memory coupled to the at least one processor,
wherein the at least one processor is configured:
to receive, by a user equipment (UE), a feedback configuration including a group identifier to report aperiodic channel state information (A-CSI) feedback using a physical uplink control channel (PUCCH);

to receive, by the UE, a CSI trigger to report A-CSI feedback, wherein the CSI trigger includes a group common downlink control indicator (DCI);

to determine, by the UE, channel condition information associated with the A-CSI feedback in response to the CSI trigger; and to report, by the UE to a base station, the A-CSI feedback using the PUCCH.

28. The apparatus of claim 25, wherein the means for reporting further includes transmitting each report of the plurality of A-CSI reports in a corresponding slot of the plurality of slots using a same PUCCH resource identified in the CSI trigger in each of the plurality of slots.

29. The non-transitory computer-readable medium of claim 26, wherein the program code executable by the computer for causing the computer to report further includes program code executable by the computer for causing the to:

transmit each report of the plurality of A-CSI reports over a configured set of PUCCH resources beginning at a first PUCCH resource identified in the CSI trigger and using a hopping pattern after the first PUCCH resource.

\* \* \* \* \*